(12) United States Patent
Chiang et al.

(10) Patent No.: US 11,943,476 B2
(45) Date of Patent: Mar. 26, 2024

(54) METHODS AND APPARATUSES FOR CODING VIDEO DATA WITH ADAPTIVE SECONDARY TRANSFORM SIGNALING

(71) Applicant: MEDIATEK INC., Hsinchu (TW)

(72) Inventors: Man-Shu Chiang, Hsinchu (TW); Chih-Wei Hsu, Hsinchu (TW); Tzu-Der Chuang, Hsinchu (TW); Ching-Yeh Chen, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 227 days.

(21) Appl. No.: 17/603,484

(22) PCT Filed: Apr. 15, 2020

(86) PCT No.: PCT/CN2020/084896
§ 371 (c)(1),
(2) Date: Oct. 13, 2021

(87) PCT Pub. No.: WO2020/211776
PCT Pub. Date: Oct. 22, 2020

(65) Prior Publication Data
US 2022/0224898 A1 Jul. 14, 2022

Related U.S. Application Data

(60) Provisional application No. 62/834,487, filed on Apr. 16, 2019.

(51) Int. Cl.
*H04N 19/60* (2014.01)
*H04N 19/12* (2014.01)
(Continued)

(52) U.S. Cl.
CPC ............. *H04N 19/60* (2014.11); *H04N 19/12* (2014.11); *H04N 19/167* (2014.11);
(Continued)

(58) Field of Classification Search
CPC .... H04N 19/423; H04N 19/428; H04N 19/44; H04N 19/176; H04N 19/61;
(Continued)

(56) References Cited

U.S. PATENT DOCUMENTS 10,708,164 B2 * 7/2020 Seregin ................ H04N 19/186
10,855,997 B2 * 12/2020 Chiang ................ H04N 19/176
(Continued)

FOREIGN PATENT DOCUMENTS

CA     3 057 445 A1    9/2018
CN    102843560 A    12/2012
(Continued)

OTHER PUBLICATIONS

International Search Report and Written Opinion dated Jul. 6, 2020, issued in application No. PCT/CN2020/084896.
(Continued)

*Primary Examiner* — Masum Billah
(74) *Attorney, Agent, or Firm* — McClure, Qualey & Rodack, LLP

(57) ABSTRACT

Video processing methods and apparatuses implemented in a video encoding or decoding system with conditional secondary transform signaling. The video encoding system determines and applies a transform operation to residuals of one or more transform blocks to generate final transform coefficients, and skip signaling a secondary transform index if a position of a last significant coefficient in each considered transform block is less than or equal to a predefined position; otherwise, the video encoding system signals a secondary transform index according to the transform operation. The video decoding system parses last significant coefficient position syntax of each considered transform block to determine a position of a last significant coefficient, and infers inverse secondary transform is not applied if the
(Continued)

positions of the last significant coefficients are less than or equal to the predefined position; otherwise, the video decoding system determines an inverse transform operation by parsing a secondary transform index.

17 Claims, 9 Drawing Sheets

(51) Int. Cl.
  *H04N 19/167* (2014.01)
  *H04N 19/176* (2014.01)
  *H04N 19/18* (2014.01)
  *H04N 19/186* (2014.01)
  *H04N 19/70* (2014.01)

(52) U.S. Cl.
  CPC ........... *H04N 19/176* (2014.11); *H04N 19/18* (2014.11); *H04N 19/186* (2014.11); *H04N 19/70* (2014.11)

(58) Field of Classification Search
  CPC .. H04N 19/157; H04N 19/122; H04N 19/124; H04N 19/625; H04N 19/70; H04N 19/105; H04N 19/119; H04N 19/12
  USPC ......................................................... 375/240
  See application file for complete search history.

(56) References Cited

U.S. PATENT DOCUMENTS

| | | | |
|---|---|---|---|
| 10,873,762 B2 | 12/2020 | Zhao et al. | |
| 11,496,385 B2 | 11/2022 | Seregin et al. | |
| 11,546,635 B2 | 1/2023 | Tsukuba | |
| 11,638,005 B2 | 4/2023 | Kim et al. | |
| 11,743,510 B2 | 8/2023 | Ikai | |
| 2011/0249724 A1 | 10/2011 | Nguyen et al. | |
| 2012/0082391 A1 | 4/2012 | Fernandes et al. | |
| 2013/0003856 A1 | 1/2013 | Saxena et al. | |
| 2017/0094313 A1 | 3/2017 | Zhao et al. | |
| 2017/0094314 A1 | 3/2017 | Zhao | |
| 2017/0324643 A1 | 11/2017 | Seregin et al. | |
| 2017/0357616 A1 | 12/2017 | Budagavi et al. | |
| 2018/0103252 A1 | 4/2018 | Hsieh et al. | |
| 2018/0302631 A1* | 10/2018 | Chiang | H04N 19/176 |
| 2018/0367814 A1 | 12/2018 | Seregin | |
| 2019/0052909 A1 | 2/2019 | Choi et al. | |
| 2020/0177889 A1 | 6/2020 | Kim et al. | |
| 2020/0322623 A1* | 10/2020 | Chiang | H04N 19/159 |
| 2021/0084314 A1 | 3/2021 | Salehifar | |
| 2021/0120269 A1 | 4/2021 | Chen et al. | |
| 2021/0297701 A1 | 9/2021 | Tsukuba | |

FOREIGN PATENT DOCUMENTS

| | | |
|---|---|---|
| CN | 103636205 A | 3/2014 |
| CN | 105306956 A | 2/2016 |
| CN | 108141596 A | 6/2018 |
| CN | 108141597 A | 6/2018 |
| CN | 108322745 A | 7/2018 |
| CN | 109076222 A | 12/2018 |
| CN | 109076223 A | 12/2018 |
| CN | 109076226 A | 12/2018 |
| CN | 109076230 A | 12/2018 |
| CN | 109076243 A | 12/2018 |
| EP | 3 457 691 A1 | 3/2019 |
| TW | 201902219 A | 1/2019 |
| WO | 2017/058615 A1 | 4/2017 |
| WO | 2017/191782 A1 | 11/2017 |
| WO | 2018/038554 A1 | 3/2018 |
| WO | 2018/166429 A1 | 9/2018 |
| WO | 2018/173432 A1 | 9/2018 |
| WO | 2018/174402 A1 | 9/2018 |
| WO | WO-2018173432 A1 * | 9/2018 |
| WO | 2018/188648 A1 | 10/2018 |

OTHER PUBLICATIONS

Koo, M., et al.; "CE6: Reduced Secondary Transform (RST) (CE6-3.1);" Joint Video Experts Team (JVET) of ITU-T SG 16 WP 3 and ISO/IEC JTC 1/SC 29/WG 11; Mar. 2019; pp. 1-16.
Chen, J., et al.; "Algorithm Description of Joint Exploration Test Model 2;" Joint Video Exploration Team (JVET) of ITU-T SG 16 WP 3 and ISO/IEC JTC 1/SC 29/WG 11; Feb. 2016; pp. 1-32.
Chinese language office action dated Jun. 29, 2021, issued in application No. TW 109112745.
International Search Report and Written Opinion dated Jul. 6, 2020, issued in application No. PCT/CN2020/084898.
Chinese language office action dated May 18, 2021, issued in application No. TW 109112747.
International Search Report and Written Opinion dated Jul. 1, 2020, issued in application No. PCT/CN2020/084895.
Chinese language office action dated Jun. 30, 2021, issued in application No. TW 109112744.
Extended European Search Report dated Mar. 13, 2023, issued in application No. EP 20791984.6.
Extended European Search Report dated Mar. 13, 2023, issued in application No. EP 20791623.0.
Siekmann, M., et al.; "CE6—related: Simplification of the Reduced Secondary Transform;" Joint Video Experts Team (JVET) of ITU-T SG 16 WP 3 and ISO/IEC JTC 1/SC 29/WG 11; Mar. 2019; pp. 1-10.
Koo, M.; "Cross-check of JVET-N0555 (CE6-related: Simplification of the Reduced Secondary Transform;" Joint Video Experts Team (JVET) of ITU-T SG 16 WP 3 and ISO/IEC JTC 1/SC 29/WG 11; Mar. 2019; pp. 1-3.
De-Luxán-Hernández, S., et al.; "Non-CE3/Non-CE8: Enable Transform Skip in CUs using ISP;" Joint Video Experts Team (JVET) of ITU-T SG 16 WP 3 and ISO/IEC JTC 1/SC 29/WG 11; Mar. 2019; pp. 1-4.
Xiu, X., et al.; "On signaling adaptive color transform at TU level;" Joint Collaborative Team on Video Coding (JCT-VC) of ITU-T SG 16 WP 3 and ISO/IEC JTC 1/SC 29/WG 11; Jun. 2015; pp. 1-5.
Koo, M., et al.; "CE6: Reduced Secondary Transform (RST) (CE6-3.1);" Joint Video Experts Team (JVET) of ITU-T SG 16 WP 3 and ISO/IEC JTC 1/SC 29/WG 11; Mar. 2019; pp. 1-41.
Chinese language office action dated Mar. 24, 2023, issued in application No. CN 202080028559.9.
Koo, M., et al.; "CE6: Reduced Secondary Transform (RST) (test 6.5.1);" Joint Video Experts Team (JVET) of ITU-T SG 16 WP 3 and ISO/IEC JTC 1/SC 29/WG 11; Jan. 2019; pp. 1-14.
Wang, Z., et al.; "Transform coding of DCT coefficients in video encoder;" Journal on Communcations; vol. 29; No. 6; Jun. 2008; pp. 133-136.
English language translation of abstract of "Transform coding of DCT coefficients in video encoder".
Chinese language Notice of Allowance dated Aug. 25, 2023, issued in application No. CN 202080029163.6.
Chinese language Notice of Allowance dated Jul. 28, 2023, issued in application No. CN 202080028559.9.
Zhao, H., et al.; "Recent progress of AVS;" Feb. 2019; pp. 1-7.
English language translation of abstract of "Recent progress of AVS".
Li, W.; "Research of video intra prediction coding strategy for HEVC;" Jun. 2016.
English language translation of abstract of "Research of video intra prediction coding strategy for HEVC;" (pp. 6-7 of publication).
Notice of Allowance dated Dec. 8, 2023, issued in U.S. Appl. No. 17/603,505.

* cited by examiner

Fig. 10

METHODS AND APPARATUSES FOR CODING VIDEO DATA WITH ADAPTIVE SECONDARY TRANSFORM SIGNALING

CROSS REFERENCE TO RELATED APPLICATIONS

The present invention claims priority to U.S. Provisional Patent Application, Ser. No. 62/834,487, filed on Apr. 16, 2019, entitled "Secondary transform with smart signaling". The U.S. Provisional Patent Application is hereby incorporated by reference in its entirety.

FIELD OF THE INVENTION

The present invention relates to video processing methods and apparatuses encode or decode video data in a video coding system. In particular, the present invention relates to encoding or decoding methods with conditional secondary transform signaling.

BACKGROUND AND RELATED ART

The High-Efficiency Video Coding (HEVC) standard is the latest video coding standard developed by the Joint Collaborative Team on Video Coding (JCT-VC) group of video coding experts from ITU-T Study Group. The HEVC standard relies on a block-based coding structure which splits each video picture into multiple non-overlapped square Coding Tree Units (CTUs). Each individual CTU in a video picture or a slice is processed in a raster scanning order. In the HEVC main profile, the maximum and the minimum sizes of a CTU are specified by syntax elements signaled in the Sequence Parameter Set (SPS). A coded picture may be represented by a collection of slices, and each slice is composed of an integer number of CTUs. A Bi-predictive (B) slice may be decoded using intra prediction or inter prediction with at most two motion vectors and reference indices to predict sample values of each block in the B slice. A Predictive (P) slice is decoded using intra prediction or inter prediction with at most one motion vector and reference index to predict sample values of each block in the P slice. An Intra (I) slice is decoded using intra prediction only.

Each CTU is further recursively partitioned into one or more non-overlapped Coding Units (CUs) using quadtree (QT) splitting structure in order to adapt various local characteristics. At each partition depth of the QT splitting structure, an N×N block is either a single leaf CU or split into four smaller blocks with equal size N/2×N/2. The CTU with the size M×M pixel samples is the root node of a quadtree coding tree, and the four M/2×M/2 blocks are the child quadtree nodes split from the root node. Each of the four M/2×M/2 blocks may become a parent node partitioned by another QT splitting to result in four child nodes with further reduced size by half in each spatial dimension. If a coding tree node is not further split, it is called a leaf CU. The leaf CU size is restricted to be larger than or equal to a minimum allowed CU size, which is also specified in the SPS. An example of a recursive quadtree splitting structure is illustrated in FIG. 1, where the solid lines indicate CU boundaries in the CTU 10.

Once the CTUs are partitioned into leaf CUs, each leaf CU is subject to further split into one or more Prediction Units (PUs) according to a PU splitting type for prediction according to the HEVC standard. Unlike the recursive quadtree splitting for CUs, each leaf CU may only be split once to form one or more PUs. The PU and associated CU syntax work as a basic representative block for sharing prediction information as the same prediction process is applied to all pixel samples in the PU. The prediction information is conveyed to the decoder on a PU basis. After obtaining residuals generated by the prediction process based on the PU splitting type, the residuals belong to a leaf CU is partitioned into one or more Transform Units (TUs) according to a Residual QuadTree (RQT) splitting structure for transforming the residuals into transform coefficients for compact data representation. The dashed lines in FIG. 1 indicate TU boundaries in the CTU 10. The TU is a basic representative block for applying transform and quantization on the residual data or transform coefficients. For each TU, a transform matrix having the same size as the TU is applied to the residuals to generate transform coefficients, and these transform coefficients are quantized and conveyed to the decoder on a TU basis.

The terms Coding Tree Block (CTB), Coding block (CB), Prediction Block (PB), and Transform Block (TB) are defined to specify two-dimensional (2-D) sample array of one color component associated with the CTU, CU, PU, and TU respectively. For example, a TU consists of one luminance (luma) TB, two chrominance (chroma) TBs, and its associated syntax elements in a picture coded with 4:2:0 color format. A similar relationship is valid for CTU, CU, and PU. In the HEVC system, the same quadtree splitting structure is generally applied to both luma and chroma components unless a minimum size for the chroma block is reached.

Joint Video Expert Team (JVET) of ITU-T SG16 WP3 and ISO/IEC JTC1/SC29/WG11 are currently in the process of establishing the next-generation video coding standard Versatile Video Coding (VVC). Various promising coding tools are developed and adopted in the upcoming emerging VVC, for example Transform Skip Mode and Reduced Secondary Transform.

Transform Skip Mode Transform Skip Mode (TSM) is a coding tool processes a quantized residual signal by entropy coding without going through a transform operation. A quantized residual signal of a block coded in TSM is encoded directly in a sample domain instead of transforming into a frequency domain. TSM is found to be particularly beneficial for screen content coding especially for regions with sharp edges and simple colors. In the VVC working draft, TSM is controlled by high level syntax, for example, an enable flag may be used to select TSM on or off, and a syntax element may be used to signal a size constraint for applying TSM. For example, TSM is allowed to be applied to a transform block with a width or height larger than or equal to 32 luma samples. A transform block level flag is signaled to indicate whether TSM is applied to a current transform block when TSM is enabled. Both dependent quantization and sign data hiding are disabled when TSM is enabled for a transform block. Residuals coded in TSM are processed by a separate parsing process.

Reduced Secondary Transform Reduced Secondary Transform (RST) is a new coding tool proposed in VVC to further improve the coding efficiency. RST is also called Low Frequency Non-separable Secondary Transform (LFNST) in some proposals. RST is applied only to intra coded blocks. The main concept of RST is to map an N dimensional vector to an R dimensional vector in a different space, where R is less than N and R/N is the reduction factor. The RST matrix $T_{R \times N}$ is an R×N matrix as follows:

$$T_{R \times N} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix}$$

where R rows of the transform are R bases of the N dimensional space. The inverse transform matrix for RST is the transpose of its forward transform matrix. The forward and inverse RST operations are depicted in FIG. 2.

There are two RST types, including RST 8×8 and RST 4×4 types, selected according to a block size of a current transform block. The RST 8×8 type is selected when a minimum of a width and height is larger than or equal to 8 (which means both the width W and height H of a transform block are greater than 4) and the RST 4×4 type is selected when a width or height is smaller than or equal to 4. In an example of the RST 8×8 type with a reduction factor of 4 (i.e. ¼ size), a 16×64 RST matrix is used at the encoder side, and a 64×16 inverse RST matrix is used at the decoder side. The input of the 16×64 RST matrix is primary transform coefficients in a 8×8 top-left region and the output of the matrix is 16 secondary transform coefficients. The forward RST 8×8 type applies 16×64 matrices (or 8×64 matrices for 8×8 blocks) to produce non-zero coefficients only in the top-left 4×4 region within the given 8×8 top-left region. In other words, after applying secondary transform, the top-left 8×8 region except the top-left 4×4 region will only have zero coefficients. In another example of the RST 8×8 type with a reduction factor of 4 (i.e. ¼ size), a 16×48 RST matrix is used at the encoder side, and a 48×16 inverse RST matrix is used at the decoder side. The input of the 16×48 RST matrix is the first 48 primary transform coefficients, which may be extracted by the first three 4×4 sub-blocks, in an 8×8 top-left region and the output of the matrix is 16 secondary transform coefficients. The forward RST 8×8 type applies 16×48 matrices (or 8×48 matrices for 8×8 blocks) to produce non-zero coefficients only in the top-left 4×4 region (or the first 8 coefficients, which may be in diagonal scanning, in the top-left 4×4 region). In other words, after applying secondary transform, the top-left 8×8 region except for the top-left 4×4 region will only have zero coefficients. For each block selected the RST 4×4 type, a 16×16 (or 8×16 matrices for 4×4 blocks) direct matrix multiplication is applied. If both the width (W) and height (H) of a transform block are greater than 4, then the RST 8×8 type is applied on primary transform coefficients in the top-left 8×8 region of the transform block. Otherwise, the RST 4×4 type is applied on primary transform coefficients in the top-left min(4,W)×min(4,H) region of the transform block.

An inverse RST is conditionally applied when the following two conditions are satisfied. A first condition is met when a block size is greater than or equal to a given threshold, for example, when a width is larger than or equal to 4 and a height is greater than or equal to 4. A second condition is met when a transform skip mode flag is zero.

A RST index equals to 0 indicating RST is not applied to a current CU, otherwise the RST index indicates which secondary transform kernel is chosen for the current CU. RST is applied for intra CUs in both intra and inter slices. In cases when a dual tree is enabled, RST indices for luma and chroma components are signaled separately. In cases when a dual tree is disabled, for each intra CU in the inter slice, a single RST index is signaled and used for luma or chroma components.

Intra Sub-Partitions (ISP) mode is a new intra prediction mode proposed in VVC. The description of ISP mode is as follows. ISP divides luma intra-predicted blocks vertically or horizontally into 2 or 4 sub-partitions depending on their block sizes. For each sub-partition, reconstructed samples are obtained by adding the residual signal to the prediction signal. Here, a residual signal is generated by the processes such as entropy decoding, inverse quantization and inverse transform. Therefore, the reconstructed sample values of each sub-partition are available to generate the prediction of the next sub-partition, and each sub-partition is processed repeatedly. In addition, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. All sub-partitions share the same intra prediction mode. RST is disabled or is conditionally applied for blocks coded by ISP mode. The RST index is not signaled when secondary transform is disallowed for ISP mode The RST index is not signaled when secondary transform is disallowed for ISP mode. Disabling RST for ISP-predicted residuals can reduce encoding complexity.

RST Selection A secondary transform set for an intra CU is first selected from four transform sets according to a block size and/or an intra prediction mode of the intra CU. Each transform set consist of two transform matrices (also referred to as kernels), and a RST index is used to select one transform matrix from the selected transform set when the RST index is larger than zero. Kernel 1 in the selected transform set is selected when the RST index signaled at the CU level is equal to 1, and kernel 2 in the selected transform set is selected when the RST index signaled at the CU level is equal to 2. Transform set 0 is selected or the corresponding intra prediction mode for luma component is used to select the transform set if one of three Cross Component Linear Model (CCLM) modes for chroma components is indicated; otherwise the transform set selection is based on the intra prediction mode as shown in Table 1.

TABLE 1

Transform set selection table

| IntraPredMode | Transform Set Index |
| --- | --- |
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

The index IntraPredMode in Table 1 is the intra prediction mode number of the current CU, which has a range of [−14, 83] including regular intra directional modes and wide angle intra prediction modes.

Simplification of RST A simplification method limits a worse case number of multiplications per sample to be less than or equal to 8. For example, worse cases in terms of multiplication counts for the RST 8×8 and RST 4×4 types occur when all TUs consist of 4×4 TU or 8×8 TU. Top 8×64 and 8×16 matrices, in other words, first 8 transform basis vectors from the top in each matrix, are applied to the 8×8 TU and 4×4 TU, respectively. In the case of a TU larger than 8×8, the worse case does not occur so that one of 16×64 matrices (i.e. RST 8×8 type) is applied to the top-left 8×8 region of the TU. For an 8×4 or 4×8 TU, one of 16×16 matrices (i.e. RST 4×4) is applied to only the top-left 4×4 region excluding other 4×4 regions in the top-left 8×8 region in order to avoid worse case happening. In the case of processing a 4×N or N×4 TU (where N is larger than or equal to 16), the RST 4×4 type is applied to one or each of two adjacent top-left 4×4 blocks. With the aforementioned simplification, the worse case number of multiplication counts becomes 8 multipliers per sample.

RST Matrices of Reduced Dimension To reduce the storage requirement and the computational complexity, RST matrices with reduced dimension such as 16×48 matrices are applied instead of 16×64 matrices with the same transform set configuration. Each 16×48 matrix takes 48 input primary coefficients from three 4×4 regions in a top-left 8×8 region excluding the bottom-right 4×4 region. FIG. 3 illustrates an example of applying both primary and secondary transform to an N×M transform block. The N×M residual block 32 is processed by 2D forward primary transform to generate M×N primary coefficients 34, where N and M are larger than or equal to 8 in this example. The first three 4×4 regions in the top-left 8×8 region of the M×N primary coefficients 34 are further processed by forward secondary transform using a 16×48 kernel. The coefficients in the resulting block 36 are filled with 0, except for the first three 4×4 subblocks 362, 364, and 366 in the top-left 8×8 region of the resulting block 36. The 16 output secondary coefficients of the 16×48 kernel are stored in the top-left 4×4 subblock 362, while coefficients of the other subblocks in this transform block are reset to zero after secondary transform. With the reduced dimension design, memory usage for storing all RST matrices is reduced from 10 KB to 8 KB with a reasonable performance drop. As a result, 16×48 and 8×48 transform matrices are employed for the RST 8×8 type and 16×16 and 8×16 transform matrices are employed for the RST 4×4 type. Since there are 4 transform sets and each transform set contains 2 transform matrices, 8 different 16×48 matrices and 8 different 16×16 matrices are available for secondary transform. Each 8×48 matrix is derived by a corresponding 16×48 matrix, and similarly, each 8×16 matrix is derived by a corresponding 16×16 matrix. For example, an 8×48 matrix is just the top 8 rows of the corresponding 16×48 matrix. For example, an 8×16 matrix is just the top 8 rows of the corresponding 16×16 matrix. The 8×48 matrices are used for secondary transform of 8×8 TBs and 8×16 matrices are used for secondary transform of 4×4 TBs. In cases when the TB size is equal to 8×4 or 4×8, a 16×16 matrix is applied to only the top-left 4×4 subblock, so that the other 4×4 subblock is ignored for secondary transform. In cases when the TB size is 4×N or N×4 where N is greater than or equal to 16, a 16×16 matrix is applied to the first one or two adjacent 4×4 subblocks. For other TBs with both the width and height greater than or equal to 8, a 16×48 matrix is applied to the top-left 8×8 region.

RST Signaling As previously described, a RST index is used to indicate if secondary transform is applied and to select a secondary transform matrix from a corresponding transform set. The RST index is signaled at a CU level after signaling TU syntax. In an example of RST, the forward RST 8×8 with 16 rows of transform (i.e. R=16) uses 16×64 or 16×48 matrices to generate non-zero coefficients only in the top-left 4×4 region within the transform block. In other words, if RST is applied, the transform block except for the top-left 4×4 region contains only zero coefficients. As a result, an RST index is not signaled nor parsed when any non-zero element is detected within the transform block region other than the top-left 4×4 region because it implies that RST is not applied. The RST index is inferred to zero if it is not signaled. FIG. 4 illustrates an example of scanning the 64$^{th}$ position to the 17$^{th}$ position in an 8×8 region of a transform block for any non-zero coefficient in order to detect whether RST is applied in the transform block.

After signaling the syntax for each TU within one CU, secondary transform syntax, such as a RST index, is signaled at a CU level. The syntax for each TU may include signaling of a last significant coefficient for a TU and signaling of a significant flag for each coding group in a TU. For a coding group, where the last significant coefficient is located, the significant flag for that coding group needs not to be signaled and is inferred to be true. For a luma component, a coding group can be a 2×4/4×2/4×4 subblock in one TU. For chroma components, a coding group can be a 4×4 sub-block for an intra slice and a 2×4/4×2/4×4 sub-block for an inter slice.

Currently, secondary transform is only performed on intra blocks for both luma and chroma components. The value of a secondary transform index is from 0 to n, for example, n is 2. The secondary transform index equal to zero indicates the secondary transform is not applied. The RST index is signaled with truncated unary codes. For an example, the first bin is context coding and the second bin is bypass coding. For another example, the first and second bins are context coding.

BRIEF SUMMARY OF THE INVENTION

Methods of video processing in a video encoding system for encoding video data of video pictures comprise receiving input data associated with a current block in a current video picture, determining and applying a transform operation to residuals associated with one or more TBs of the current block to generate final transform coefficients, determining a position of a last significant coefficient of the final transform coefficients for each TB in the current block and comparing one or more positions of the last significant coefficients with a predefined position. The video encoding system further determines a value of a secondary transform index according to the transform operation applied to the current block, signals the secondary transform index in a video bitstream if at least one of the positions of the last significant coefficients is larger than the predefined position or skips signaling the secondary transform index if the one or more positions of the last significant coefficients are less than or equal to the predefined position, and encodes the current block in the video picture according to the final transform coefficients.

For example, the current block is a current CU, and the secondary transform index is signaled at a CU level after all TBs in the current block. In one embodiment, the current block is a luma Coding Block (CB) containing one or more luma TBs or the current block is a chroma CB containing one or more chroma TBs, and the secondary transform index is adaptively signaled for the one or more luma TBs in the current luma CB according to the one or more positions of the last significant coefficients in the one or more luma TBs, or the secondary transform index is adaptively signaled for the one or more chroma TBs in the current chroma CB according to the one or more positions of last significant coefficients in the one or more chroma TBs. In another embodiment, the current block is a CU containing one or more luma TBs and one or more chroma TBs, and the secondary transform index is adaptively signaled according to the one or more positions of the last significant coefficients in the one or more luma TB, one or more chroma TBs, or both luma and chroma TBs. The transform operation is performed on the one or more luma TBs, one or more chroma TBs, or both luma and chroma TBs. For example, the secondary transform index is signaled or not signaled according to the positions of the last significant coefficients in the luma and chroma TBs of the current CU, and the transform operation is only performed on the one or more luma TBs. In another example, suppose there is only one luma TB in the current CU, the secondary transform index is signaled or not signaled according to the position of the last significant coefficient in the luma TB of the current CU, and the transform operation is only performed on the luma TB. In another example, suppose there are multiple luma TBs and/or multiple chroma TBs in the current CU, the secondary transform index is signaled or not signaled according to the positions of the last significant coefficients in one or more luma TBs of the current CU, and the transform operation is only performed on one or more luma TBs. In some embodiments, secondary transform is only applied to intra coded blocks, and the video processing method further comprises predicting the current block by intra prediction to generate the residuals of the current TB. The transform operation for each non-intra coded block excludes secondary transform.

In a preferred embodiment, the predefined position is a first position in a TB and the first position is position 0 containing a DC value. In another embodiment, the predefined position is a fixed position (x,y) in a first coding group. The first coding group is a first 4×4 subblock according to a processing order in a top-left 8×8 region of the current block, and x and y are integers selected from zero to (a maximum coding group size−1).

In some embodiments, the processing method further comprises determining if secondary transform is applied to the one or more TBs in the current block, and the transform operation comprises primary transform then secondary transform if secondary transform is applied, or the transform operation comprises only primary transform if secondary transform is not applied. In one embodiment, the video encoding system determines secondary transform is not applied to the one or more TBs in the current block if there is only a DC value in each TB after applying transform operation to each TB. In one embodiment, the processing method further comprise signaling one or more syntax elements related to residual coding for the one or more TBs parsing after the current block only if secondary transform is not applied. That is, the one or more syntax elements are not signaled if secondary transform is applied. An embodiment of the syntax elements is significant flags for predefined coding groups. For example, the significant flags for a zero-out region of secondary transform in the TB are only signaled in the video bitstream when secondary transform is not applied. The zero-out region of secondary transform is a region with all transform coefficients set to zero after secondary transform, for example, all transform coefficients in the transform block except for the top-left 4×4 subblock are reset to zero after secondary transform.

In one embodiment, the current block is a TB and the secondary transform index is signaled after signaling coefficients of the current block or after signaling the position of the last significant coefficient of the current block. In some embodiments, the step of comparing one or more positions of the last significant coefficients with a predefined position is only applied to considered TBs in the current block, and the step of signaling or skip signaling the secondary transform index only depends on the positions of the last significant coefficients of the considered TBs. Some exemplary embodiments of the considered TBs include: all TBs in the current block, only luma TBs in the current block, only chroma TBs in the current block, only TBs with significant coefficients in the current block, a predefined subset of TBs in the current block, and all TBs except for those not allowed for secondary transform. For example, a TB is not allowed for secondary transform if a TB width or a TB height is less than 4 samples, or a TB is not allowed for secondary transform if it is processed by transform skip. In cases when there is no considered TB in the current block, secondary transform is not applied to any TB in the current block.

Embodiments of a video decoding method comprise receiving a video bitstream carrying input data associated with a current block in a current video picture, parsing one or more last significant coefficient position syntax for one or more TBs associated with the current block from the video bitstream, determining a position of a last significant coefficient for each TB from the corresponding last significant position syntax, comparing one or more positions of the last significant coefficients with a predefined position, determining an inverse transform operation for the current block by inferring a secondary transform index as zero if the one or more positions of the last significant coefficients for one or more TBs are less than or equal to the predefined position, or by parsing a secondary transform index from the video bitstream if at least one of the positions of the last significant coefficients is larger than the predefined position. The video decoding method further comprises applying at least inverse primary transform to the final transform coefficients of the current block to recover residuals of the current block according to the inverse transform operation, and decoding the current block in the current video picture based on the residuals of the current block. In cases when at least one of the positions of the last significant coefficients is larger than the predefined position, according to the parsed secondary transform index for the current block, inverse secondary transform is applied before applying inverse primary transform to the final transform coefficients of the current block.

According to some embodiments, the current block is a current CU and the secondary transform index is parsed after parsing all TBs in the current block. In one embodiment, the current block is a luma CB containing one or more luma TBs or a chroma CB containing one or more chroma TBs, and the secondary transform index is adaptively parsed according to the one or more positions of the last significant coefficients in the one or more luma or chroma TBs. In another embodiment, the current block is a CU containing one or more luma TBs and one or more chroma TBs, and the secondary transform index is adaptively parsed for the one or more luma or chroma TBs according to the one or more positions of the last significant coefficients in the one or more luma or chroma TBs, and transform operation is performed on the one or more luma or chroma TBs based on the parsed secondary transform index. For example, if the current CU contains one luma TB and two chroma TBs, the secondary transform index is conditionally parsed for the luma TB according to the positions of the last significant coefficients in the luma and chroma TBs, and transform operation is only performed on the luma TB based on the parsed secondary transform index. In another example, the secondary transform index is conditionally parsed for the luma TB according to the position of the last significant coefficient in the luma TB, and the transform operation is only performed on the luma TB based on the parsed secondary transform index. In another example, suppose there are multiple luma TBs and/or multiple chroma TBs in the current CU, the secondary transform index is parsed or not parsed according to the positions of the last significant coefficients in one or more luma TBs of the current CU, and the transform operation is only performed on one or more luma TBs.

An embodiment of the predefined position is a first position in the TB, and the first position is position 0 containing a DC value. In another embodiment, the predefined position is a fixed position (x,y) in a first coding group. The first coding group is a first 4×4 subblock according to a processing order in a top-left 8×8 region of the current block, and x and y are integers selected from zero to (a maximum coding group size−1).

If secondary transform is only applied to intra coded CUs, the inverse transform operation for any non-intra coded CU excludes inverse secondary transform. The processing method further comprises decoding the current CU by intra prediction to generate the residuals.

An embodiment of the processing method further comprises parsing one or more syntax elements relate to residual coding for the one or more TBs parsing after the current block if inverse secondary transform is not applied, or inferring the one or more syntax elements if inverse secondary transform is applied. For example, the one or more syntax elements are significant flags for predefined coding groups, and the significant flags are inferred to be false if inverse secondary transform is applied. An example of the predefined coding group includes a zero-out region of secondary transform, which is a region with all transform coefficients set to zero after secondary transform. An embodiment of the current block is a transform block and the secondary transform index is parsed after parsing coefficients of the current block or after parsing the last significant coefficient position syntax of the current block.

In some embodiments, the step of comparing one or more positions of the last significant coefficients with a predefined position is only applied to considered TBs in the current block, and the step of determining an inverse transform operation for the current block only depends on positions of the last significant coefficients of the considered TBs in the current block. For example, the considered TBs comprise all TBs in the current block, only luma TBs in the current block, only chroma TBs in the current block, TBs with significant coefficients in the current block, a predefined subset of TBs in the current block, or all TBs except for those not allowed for secondary transform. An example of the TBs not allowed for secondary transform is a TB with a TB width or TB height less than 4 samples, another example is a TB processed by transform skip. In cases when there is no considered TB in the current block, inverse secondary transform is not applied to any TB in the current block.

Aspects of the disclosure further provide an apparatus implemented in a video encoding system or a video decoding system, and the apparatus adaptively signals or parses secondary transform syntax according to one or more comparison results of a last significant coefficient position and a predefined position. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein:

FIG. 10 illustrates an example of the processing order for a 16×16 transform block.

DETAILED DESCRIPTION OF THE INVENTION

Figure 1:
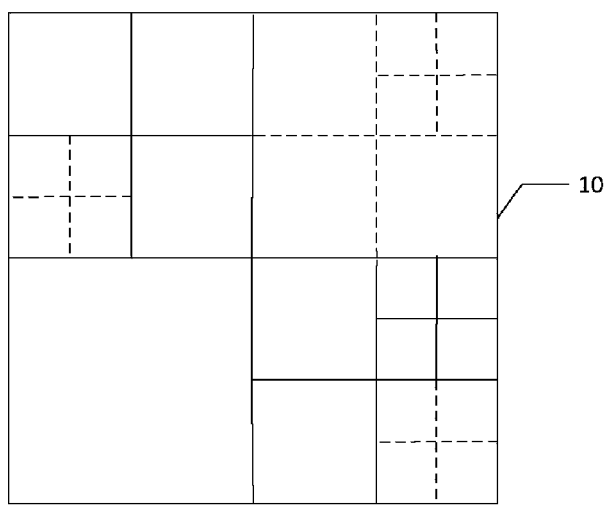
FIG. 1 illustrates an exemplary coding tree for splitting a Coding Tree Unit (CTU) into Coding Units (CUs) and splitting each CU into one or more Transform Units (TUs) according to a quadtree splitting structure.
Figure 2:
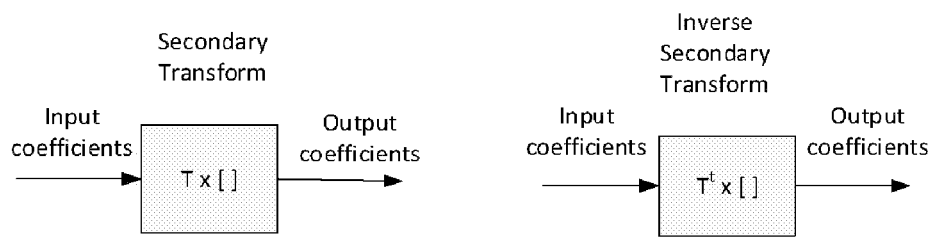
FIG. 2 illustrates simplified block diagrams of secondary transform and inverse secondary transform operations.
Figure 3:
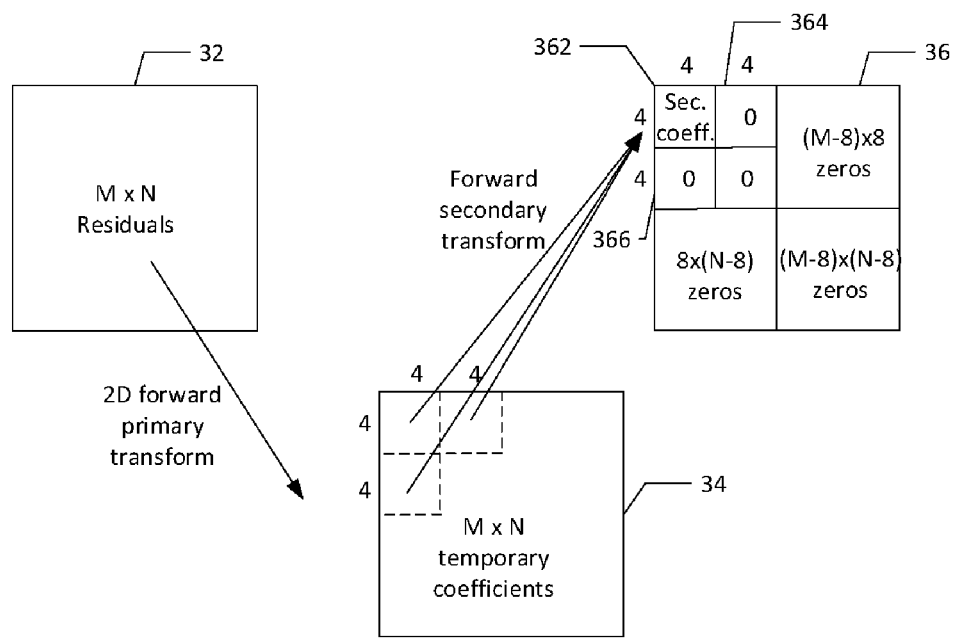
FIG. 3 illustrates applying forward primary transform and secondary transform to residuals of an N×M transform block to generate final transform coefficients.
Figure 4:
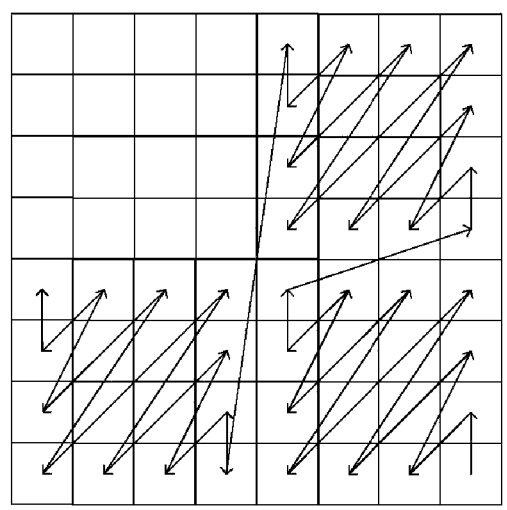
FIG. 4 illustrates an example of scanning the $64^{th}$ position to the $17^{th}$ position in a transform block for any non-zero element.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Various methods described in the present invention are aimed to improve the efficiency of secondary transform signaling or to reduce the decoding latency. At an encoder side, a current block, such as a CU, is first predicted by a prediction operation to generate a predictor. Residuals of the current block are generated according to the predictor. A transform operation, including one or both primary transform (e.g. DCT-II) and secondary transform, is applied to determine final transform coefficients. A quantization process is then applied to the final transform coefficients before entropy encoding into a video bitstream. The residuals after the primary transform are referred to as temporary transform coefficients or primary transform coefficients, and the temporary transform coefficients are processed by secondary transform to generate the final transform coefficients of the current block. If secondary transform is not applied to the current block, the temporary transform coefficients are assigned as the final transform coefficients of the current block. If primary transform is not applied, the residuals processed by secondary transform are the final transform coefficients of the current block. At a decoder side, a video bitstream is decoded to derive coefficient levels associated with a current block, and the coefficient levels are inverse quantized to generate final transform coefficients. If a secondary transform index associated with the current block is larger than zero, inverse secondary transform is first applied to the final transform coefficients to determine temporary transform coefficients. Inverse primary transform is then applied to the temporary transform coefficients to recover residuals. Only inverse primary transform is applied to the current block to recover the residuals if the secondary transform index associated with the current block is equal to zero and the conditions for applying secondary transform are satisfied (e.g. the width and height of the current transform block is larger than 4). A reconstructed block is then obtained according to the residuals and a corresponding predictor of the current block.

Setting Constraint for Applying Secondary Transform According to the recent secondary transform signaling design, a video decoder can only decide a secondary transform index, such as a RST index or a LFNST index, after the coefficients for all TBs in one CU are parsed. The video coding standard under development tends to support 64×64 pipeline processing; and the latency issue of secondary transform occurs when processing a CU with a size larger than 64×64 samples. Various embodiments of the present invention set a constraint to handle the latency issue caused by secondary transform signaling. In the recent development, secondary transform is only applied to intra coded blocks, so the current block in the following embodiments is an intra coded block. However, the current block in the following embodiments may not necessary to be an intra coded block if secondary transform can be enabled for non-intra predicted blocks. To avoid the undesired latency caused by secondary transform signaling, secondary transform cannot be applied on the transform block(s) in a CU when a width or height of the CU is larger than a predefined threshold. In some embodiments, the width or height of the CU is measured in a number of luma samples in the luma CB within the CU. Some examples of the predefined threshold are 16, 32, 64, 128, and 256 luma samples. For example, residuals of a current block are not processed by secondary transform if any of a width or height of the current block is larger than 64 samples, so any block with a size larger than 64×64 is not processed by secondary transform. In one embodiment, the predefined threshold is set according to a maximum TU size or a maximum TB size (i.e. MaxTbSizeY) specified in the video coding standard, for example, the maximum TB size in the video coding standard under development is 64 luma samples. In yet another embodiment, the predefined threshold is adaptively determined according to a maximum TU size or a maximum TB size, which is derived from a value signaled in a Sequence Parameter Set (SPS), Picture Parameter Set (PPS), tile, tile group, or slice level. For example, a maximum TB size (MaxTbSizeY) is set as 1<<sps_max_luma_transform_size_64_flag signaled at SPS. A secondary transform index for a current block is set to be zero when the current block has a width or height larger than the predefined threshold, and this secondary transform index is signaled by the encoder and parsed by the decoder in one embodiment, or this secondary transform index is not signaled by the encoder and is inferred to be zero by the decoder in an alternative embodiment. For example, the video encoder signals a secondary transform index for every intra coded CU to indicate whether secondary transform is applied, and if it is applied, the secondary transform index also indicates which matrix is selected by the encoder. A corresponding video decoder in this embodiment parses a secondary transform index for each intra coded CU to determine whether inverse secondary transform needed to be applied. The video decoder may check a width or height of each intra coded CU with the predefined threshold for bitstream conformance as the secondary transform index for any intra coded CU has to be zero when the width or height of the intra coded CU is larger than the predefined threshold. In the alternative embodiment, the secondary transform index is not signaled at the encoder side for any intra coded CU having a CU width or height larger than the predefined threshold, and the secondary transform index is inferred as zero at the decoder side. In the above embodiments, the current block is the current CU. The current block may be a luma Coding Block (CB) containing one or more luma TBs. The current block may be a chroma CB containing one or more chroma TBs. The current block may be a luma or chroma TB. The current block may be a TU.

In some embodiments, a transform operation or inverse transform operation for one or more TUs in a current CU excludes secondary transform or inverse secondary transform based on a number of TUs in the current CU. For example, the transform operation excludes secondary transform when the number of TUs in the current CU is larger than one, and the inverse transform operation excludes inverse secondary transform when the number of TUs in the current CU is larger than one. In other words, secondary transform is disabled for a current CU when there are multiple TUs existed in the current CU (which means the width or the height of the current CU/CB are larger than the maximum TU/TB size). A secondary transform index for a current CU is forced to be zero or inferred as zero when this current CU is splitting into multiple TUs. For example, when a CU can be processed by secondary transform, a secondary transform index is signaled regardless whether this CU is further split into multiple TUs. The corresponding decoder parses the secondary transform index for the CU, but forces the secondary transform index to be zero if this CU is split into multiple TUs. In another example, a secondary transform index is not signaled when a CU is split into multiple TUs, and thus the decoder does not parse the secondary transform index and directly infers the secondary transform index as zero. An exception is that an ISP-applied luma CB (in a luma splitting tree, also called a CU) may be divided into multiple luma TBs (in a luma splitting tree, also called TUs) even if the width and height of the luma CB are not larger than the maximum TB size. In this case, secondary transform can be used when multiple TUs exist in a CU. In another embodiment, secondary transform cannot be applied to any CU with a width or height larger than a predefined threshold nor any CU split into multiple TUs. For example, a secondary transform index for a current CU is still signaled or parsed but is forced to be zero when this current CU is splitting into multiple TUs, or when a CU width is larger than a maximum TU width and/or a CU height is larger than a maximum TU height. Alternatively, the secondary transform index is not signaled at the encoder side when a current CU is split into multiple TUs or when a CU width or CU height is larger than a predefined threshold, and the secondary transform index for this current CU is inferred as zero in the decoder side.

For example, a constraint is set to skip signaling a secondary transform index for a CU splitting into multiple TUs. A CU is forced to split into multiple TUs when at least one of the following is true: a CU width is larger than a maximum TU width (or maximum TU or TB size), a CU height is larger than a maximum TU height (or maximum TU or TB size), or a CU size is larger than a maximum TU or TB size specified in the standard or in a SPS, PPS, tile, tile group, or slice level. Accordingly, a secondary transform index is not signaled nor parsed for a current CU when the current CU will be split into multiple TUs. The secondary transform index for the current CU is simply inferred to be zero when the current CU will be split into multiple TUs.

In some other embodiments of the present invention, a constraint restricts applying secondary transform or inverse secondary transform to only one selected TU within a current CU when a width or height of the current CU is larger than a predefined threshold or when the current CU contains multiple TUs. That is only the selected TU within the current CU can be processed by secondary transform when the current CU contains multiple TUs. The transform operation including secondary transform or the inverse transform operation including inverse secondary transform for the selected TU may follow the current design. For example, in an encoder side, a transform operation including only primary transform is applied to all other TUs in the current CU, whereas an auxiliary transform operation including both primary transform and secondary transform is applied to the selected TU. In a decoder side, an inverse transform operation including only inverse primary transform is applied to all other TUs in the current CU, whereas an auxiliary transform operation including both inverse secondary transform and inverse primary transform is applied to the selected TU. Some examples of the predefined threshold is set according to the maximum TU size specified by the video coding standard or adaptively determined in a SPS, PPS, tile, tile group, or slice level. In an embodiment of implementing this constraint, the selected TU is a last TU within the current CU according to a decoding order. In comparison to applying secondary transform on one of other TUs, applying second transform on the last TU leads to less latency.

Some other embodiments set a constraint to restrict a maximum width, height, or size of an intra or inter CU. For example, in order to apply secondary transform to intra coded CUs, the width or height of each intra coded CU cannot exceed a predefined threshold. The predefined threshold may be 16, 32, 64, 128, or 256 samples. In one embodiment, the predefined threshold is set according to a maximum TU size specified in the corresponding standard, such as 64 luma samples, and in another embodiment, the predefined threshold is adaptively determined according to a maximum TU size specified in a SPS, PPS, tile, tile group, or slice level. By implementing this constraint, each intra coded CU only contains one TU as the width and height of all the intra CUs are smaller than or equal to the maximum TU size.

Any of the foregoing embodiments implemented in a decoder may implicitly decide whether secondary transform is disabled according to a block width, block height, or block area, or explicitly decided by a secondary transform flag signed at CU, CTU, slice, tile, tile group, SPS, or PPS level.

Signaling Modification for Secondary Transform In order to solve the latency issue caused by the conventional design of secondary transform signaling, some embodiments of the present invention modify the current secondary transform signaling design. In some embodiments, the secondary transform syntax, such as the RST index or the LFNST index, is signaled at a TU level instead of at a CU level. For example, the secondary transform index is signaled at the end of a TU according to an embodiment. In another embodiment, the secondary transform index for a TU is signaled after signaling a last significant coefficient at a TB level, and then syntax elements for this TU, such as the significant flag for each coding group in each TB are signals.

In other words, the secondary transform syntax at a TU level is signaled before syntax elements of a next TU in the scanning order. In yet another embodiment, the secondary transform index is signaled before reconstructing the coefficients for each coefficient group. In cases when there are multiple TUs in a current CU, a secondary transform index for the current CU is signaled in at least one of the TUs. For example, the secondary transform index is signaled in a first TU of the current CU. Secondary transform can only be applied to the first TU of a current CU as secondary transform is not allowed in the following TUs of the current CU according one embodiment. In another embodiment, the signaled secondary transform index is shared with all TUs in the current CU. For example, the transform operation or inverse transform operation is applied to the following TUs according to the shared secondary transform index that is signaled in the first TU. In another example, a number of non-zero coefficients in each TU is compared with a threshold, and the TU can only apply secondary transform or inverse secondary transform according to the shared secondary transform index if the number of non-zero coefficients is larger than the threshold. In an alternative embodiment, a secondary transform index is signaled at each of the first N TUs of a current CU, where N is selected from 1 to a total number of TUs in the current CU. In yet another embodiment, the secondary transform index is signaled in a last TU within the current CU because performing secondary transform on the last TU leads to less latency compared to performing secondary transform on any other TU.

In some embodiments of secondary transform syntax signaling, after signaling the last significant coefficient at a TB level, a syntax element for secondary transform, such as the secondary transform index, is signaled. The remaining syntax elements for the TB, such as the significant flag for each coding group in the TB, are signaled. One of the embodiments of the video encoder signals a secondary transform index at a TB level after signaling the last significant coefficient at the TB level, and then signals the remaining syntax elements for the TB. In one embodiment, secondary transform syntax at a TU level is signaled after signaling the last significant coefficient at a TB level, and the syntax for a TU, such as the significant flag for each coding group in each TB, is then signaled. For example, the coding group contains 4×4 samples. In another embodiment, secondary transform syntax at a CU level is signaled after signaling the last significant coefficient at the TU level, and the syntax for a TU, such as signaling of the significant flag for each coding group in the TU, is then signaled.

In an embodiment, secondary transform syntax for a current CU, such as a RST index or LFNST index, is signaled in a first available TU in a current CU. In this embodiment, a current CU has a first available TU if both a constraint for secondary transform signaling is satisfied and secondary transform is allowed for the current CU. An example of the constraint for secondary transform signaling is depending on a position of a last significant coefficient of a TU. In another example, the constraint for secondary transform signaling only signals secondary transform syntax when a number of non-DC values in transform coefficients is larger than a predefined number. Some other examples of the constraint for secondary transform signaling will be described in the later sections. An example of allowing secondary transform is when the current CU is an intra coded CU. For each of the remaining TUs other than the first available TU within the current CU, secondary transform syntax is not signaled and is inferred to be the same as the secondary transform syntax of the first available TU according to one embodiment. That is, the remaining TUs share the secondary transform syntax with the first available TU. In this embodiment, if the constraint for secondary transform signaling is not satisfied in any remaining TU in the current block, secondary transform or inverse secondary transform will not be applied to this remaining TU regardless of the secondary transform syntax of the first available TU in the current block. In one example, if a first available TU cannot be found in a current CU for secondary transform, secondary transform will not be applied to any TU in this current CU. In another embodiment, secondary transform or inverse secondary transform is only applied to the first available TU within a current CU and not applied to the remaining TUs within the current CU.

In some embodiments, the constraint is checked with every TU within a current CU, and each TU satisfying the constraint shares the same secondary transform syntax. For example, secondary transform or inverse secondary transform can be applied to all TUs in a current CU if all the TUs satisfy the constraint for secondary transform signaling. In another embodiment, the constraint is also checked with every TU within a current CU, but secondary transform or inverse secondary transform is only applied to one or more TUs in the current CU if all TUs satisfy the constraint. Secondary transform or inverse secondary transform cannot be applied to TUs in a current CU if any TU in the current block is not available for secondary transform as the constraint for secondary transform signaling is not satisfied.

Secondary Transform Signaling based on Last Significant Coefficient The constraint for secondary transform signaling mentioned in various previously described embodiments can be set according to one or more last significant coefficients of one or more transform blocks according to some embodiments of the present invention. Embodiments of the constraint for secondary transform signaling are related to one or more positions of the last significant coefficients of one or more transform blocks. The encoder signals syntax associated with a last significant coefficient position for each transform block indicating the position of the last significant coefficient in the transform block. The decoder determines a position of a last significant coefficient in each transform block by parsing syntax associated with a last significant coefficient position for each transform block. For example, the syntax associated with the last significant coefficient position includes last_sig_coeff_x_prefix, last_sig_coeff_y_prefix, last_sig_coeff_x_suffix, and last_sig_coeff_y_suffix.

Figure 5:
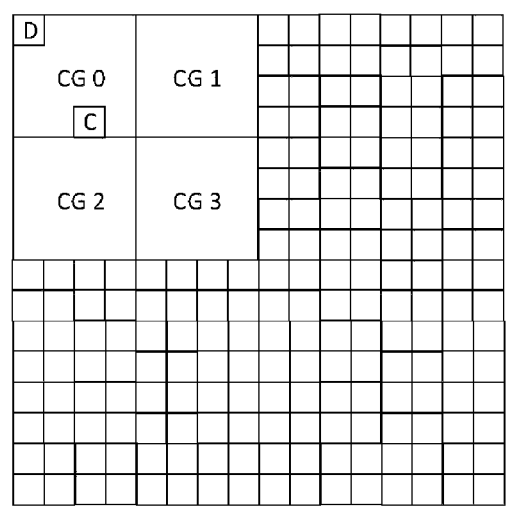
FIG. 5 illustrates a 16×16 transform block within a 16×16 CU for demonstrating some embodiments of applying secondary transform to the 16×16 transform block.

In the conventional RST signaling design, the encoder or decoder checks if there is any non-zero coefficient within a zero-out region of secondary transform, which means the coefficients after secondary transform or before inverse secondary transform are zero, and skips signaling or parsing the secondary transform index if at least one non-zero coefficient is found in the zero-out region of secondary transform. Embodiments of the present invention simplify this checking process for secondary transform signaling by only checking a TB level syntax element for each considered TB. FIG. 5 illustrates a 16×16 TU within a 16×16 CU for demonstrating various embodiments of secondary transform signaling according to a last significant coefficient signaled at a TB level. FIG. 5 illustrates a luma (luminance) Transform Block (TB) of the 16×16 TU, where the two chrominance (chroma) TBs of the 16×16 TU are not shown for brevity. In some embodiments of secondary transform signaling, a secondary transform index such as the RST index or LFNST index, is adaptively signaled for a current block according to a position of a last significant coefficient in each TB in the current block. For example, a current block is a luma CB containing one or more luma TBs or the current block is a chroma CB containing one or more chroma TBs, and a secondary transform index is conditionally signaled according to one or more positions of the last significant coefficients in the luma or chroma TB(s). For another example, a current block is a CU and a secondary transform index is adaptively signaled for one or more luma TBs in a current CU according to positions of last significant coefficients in one or more luma TBs, and this secondary transform index is shared by the luma and chroma TBs in the current CU. In another example, a current block is a CU contains one or more luma TBs and one or more chroma TBs, and a secondary transform index is conditionally signaled according to one or more positions of the last significant coefficients in one or both the luma and chroma TBs. Secondary transform is only applied to one or more luma or chroma TBs. The secondary transform index is assumed to be signaled at a CU level or after parsing all TBs in the current block in the following embodiments; however, these embodiments can also be implemented with the secondary transform index signaled in a TB level (e.g. signaled after parsing the coefficients in the current TB or signaled after parsing the last significant coefficient positions in the current TB) or a TU level (or after parsing the TBs within the current TU). For example, the secondary transform index for a current CU is signaled at a CU level after all TBs in the current CU. In cases when secondary transform is applied to this 16×16 CU, a 16×48 matrix multiplication is applied to the 16×16 transform block within the 16×16 CU using a selected secondary transform kernel. Each coding group in these embodiments is a 4×4 subblock in the transform block. The first, second, third, and fourth coding groups within a top-left 8×8 region of the transform block are denoted as CG 0, CG 1, CG 2, and CG 3. The corresponding significant flags for CG 0, CG 1, CG 2, and CG 3 are denoted as SigFlagCG0, SigFlagCG1, SigFlagCG2, and SigFlagCG3 respectively. In the video encoder, the 16×16 TU is first processed by primary transform to generate primary transform coefficients, and the 48 primary transform coefficients in the first three coding groups CG 0, CG 1, CG 2 are the input of secondary transform. The 48 primary transform coefficients are multiplied with a selected 16×48 matrix to generate 16 secondary transform coefficients. After applying secondary transform, coefficients in the first coding group CG 0 are set to equal to the generated 16 secondary transform coefficients, while all remaining coefficients in the transform block are set to zero according to one embodiment. In cases when secondary transform is not applied, the second, third and fourth coding groups CG 1, CG 2, CG 3 and/or the remaining region in the transform block may contain non-zero coefficients. The region having all transform coefficients set to zero after secondary transform is referred to as a zero-out region of secondary transform.

Instead of searching for non-zero coefficients within a zero-out region of secondary transform, embodiments of the present invention check a position of a last significant coefficient for each considered transform block. A secondary transform index is adaptively signaled for a current CU according to the position(s) of the last significant coefficient(s) in one or more considered TBs within the current CU. Some examples of the considered TUs are all TBs in the current CU, only luma TBs in the current CU, only chroma TBs in the current CU, only TBs with significant coefficients in the current CU, a predefined subset of TBs in the current block, or all TBs except for those not allowed for secondary transform. The TBs not allowed for secondary transform include any TB with a TB width or TB height less than 4 samples or any TB processed by transform skip. If there is no considered TB in the current block, secondary transform is not applied to any TB in the current block. For example, the video encoder skips signaling the secondary transform index if the position of the last significant coefficient in any considered TB is within a predefined region (e.g. zero-out region of secondary transform where all coefficients are set to zero after secondary transform) in this embodiment. The video decoder infers secondary transform is not applied to a current CU when a position of a last significant coefficient in any considered TB within the current CU is located in the predefine region. In one embodiment, the predefined region includes CG 1, CG 2, or CG 3 of the current transform block. The video decoder thus infers secondary transform is not applied to a current CU when a position of a significant coefficient in any considered transform block within the current CU is in CG 1, CG 2, or CG 3, as all coefficients in CG 1, CG 2, and CG 3 are set to zero after secondary transform. In another embodiment, the predefined region includes the entire TB except for a top-left 4×4 subblock, or the predefined region includes those coefficient positions with position indices in a TB larger than 15 assuming the position index ranging from 0 and the processing order is diagonal scanning for the whole TB. In another embodiment, the predefined region includes the entire TB except for the first 8 coefficient positions, or the predefined region includes those coefficient positions with position indices in a TB larger than 7 assuming the position index ranging from 0 and the processing order is diagonal scanning for the whole TB. In the preferred embodiments of the present invention, according to a position of a last significant coefficient in each considered TB, secondary transform is inferred to be disabled without any syntax signaling, which means a secondary transform index will not be signaled at the encoder and the secondary transform index will not be parsed at the decoder. For example, the video decoder infers a corresponding secondary transform index for a current CU to be zero without parsing the secondary transform index from the video bitstream when a position of a last significant coefficient of any considered transform block within the current CU is in a predefined region of secondary transform in the transform block.

In one embodiment, coefficients in second, third, fourth coding groups CG1, CG2, and CG 3 of the top-left 8×8 region are set to zero after secondary transform. In another embodiment, all transform coefficients except for the top-left 4×4 subblock are set to zero after secondary transform. In another embodiment, when the predefined region refers to a zero-out region of secondary transform, the predefined region varies according to the TB width or TB height. For example, if the TB width is equal to the TB height and the TB width is equal to 4 or 8, RST 8×N where N=16, 48, or 64, is applied to the TB as introduced and then the coefficients after secondary transform are zero if the position index in the TB is larger than 7. In this example, the predefined region includes those coefficient positions with the position indices in a TB larger than 7 assuming the position index ranging from 0 and the processing order is diagonal scanning for the whole TB. In another example, if RST 16×N where N=16, 48, or 64, is applied to the TB as introduced and then the coefficients after secondary transform are zero if the position index in the TB is larger than 15. In this example, the predefined region includes those coefficient positions with the position indices in a TB larger than 15 assuming the position index ranging from 0 and the processing order is diagonal scanning for the whole TB. According to these embodiments, secondary transform is not applied when a position of a last significant coefficient for any considered transform block is in any of second, third, and fourth coding groups CG 1, CG 2, and CG 3 in a top-left 8×8 region of the transform block, when the position of the last significant coefficient of any considered transform block is not in the first coding group CG 0 in the top-left 8×8 region, or when a position of a last significant coefficient of any considered transform block is in the predefined region. In the decoder, after parsing of a last significant coefficient position for each considered transform block in the current CU, a secondary transform index is inferred to be zero when a position of a last significant coefficient for any considered transform block is in a top-left 8×8 region except for a first coding group CG, the entire transform block except for a first coding group CG 0, or the predefined region. The encoder in this embodiment adaptively skips signaling a secondary transform index for a current CU according to a position of a last significant coefficient of each considered TB within the current CU and the predefined position, and the decoder infers inverse secondary transform is disabled for the current CU according to the positions of the last significant coefficients of the considered TBs within the current CU and the predefined position. For example, inverse secondary transform is disabled by inferring a secondary transform index for a current CU to be zero when a position of a last significant coefficient for any considered TB falls in the predefined region such as a coding group other than the first coding group in a TB. The encoder in one embodiment only signals a secondary transform index when all position of last significant coefficients in the considered transform blocks are not in the predefined region. Similarly, the decoder in this embodiment only parses a secondary transform index when all positions of last significant coefficients in the considered transform blocks are not in the predefined region; otherwise the decoder infers inverse secondary transform is disabled for the transform block or the entire CU. The decoder determines the position of the last significant coefficient in a transform block by parsing last significant coefficient position syntax at the TB level.

In some of the above embodiments, one or more syntax elements related to residual coding for some predefined coding groups in a transform block do not need to be signaled when secondary transform is applied to the transform block. For example, these syntax elements related to residual coding for some predefined coding group in one or more transform blocks parsed after the current block are always equal to zero when secondary transform is applied to the transform block, therefore, these syntax elements related to residual coding are not signaled in a video bitstream nor parsed from the video bitstream when a secondary transform index is larger than zero. After applying secondary transform, coefficients in some coding groups are all set to zero, which implies some particular syntax elements related to residual coding, such as the significant flag for these coding groups, do not need to be signaled. In one example, coefficients in the second, third, and fourth coding groups CG 1, CG 2, and CG 3 as well as the region outside the top-left 8×8 region are set to zero after secondary transform. FIG. 5 illustrates an example of a 16×16 transform block within a 16×16 CU. Each 4×4 sub-block in the 16×16 transform block is a coding group. The coding groups within the top-left 8×8 region are denoted as CG 0, CG 1, CG 2, and CG 3, and the corresponding significant flags for these coding groups are denoted as $SigFlag_{CG0}$, $SigFlag_{CG1}$, $SigFlag_{CG2}$, and $SigFlag_{CG3}$. If secondary transform is applied, a 16×48 matrix is selected in the secondary transform operation to transform the first 48 primary transform coefficients in the top-left 8×8 region of this 16×16 transform block into 16 secondary transform coefficients. Coefficients in the transform block except for the first coding group CG 0 are set to zero after secondary transform according to one embodiment, so the significant flags $SigFlag_{CG1}$, $SigFlag_{CG2}$, and $SigFlag_{CG3}$ for CG 1, CG 2, and CG 3, as well as the significant flags for the region outside the top-left region, are not signaled at the encoder side and are inferred to be false at the decoder side according to this embodiment.

Secondary Transform Signaling Depend on Comparing Last Significant Coefficient Position with Threshold In some embodiments of the present invention, secondary transform syntax is conditionally signaled in a video bitstream depending on one or more comparison results from one or more Transform Blocks (TBs) within a CU. One comparison includes checking a position of a last significant coefficient in a TB with a predefined position. In some embodiments, secondary transform syntax is conditionally signaled in a video bitstream only depending on comparison results from considered TBs within a current CU. For example, all TBs in the current CU are the considered TBs. In another example, only luma TBs in the current CU are the considered TBs. In another example, only the TBs with significant coefficients in the current CU are the considered TBs. In another example, the considered TBs can be any subset of TBs in the current CU. In another example, in the current CU, the TBs, except for those not allowed for secondary transform, are the considered TBs. For example, a TB is not allowed for secondary transform if a TB width or TB height is smaller than 4, or a TB is not allowed for secondary transform if it is processed by transform skip. When the comparison results for all considered TBs do not satisfy the signaling condition of secondary transform, secondary transform is inferred as disabled for the current CU and a secondary transform index is not signaled in the video bitstream. When there is no considered TB within the current CU, the secondary transform index is not signaled as secondary transform is disabled for the current CU. An example of setting the signaling condition of secondary transform is when the position of the last significant coefficient for a TB is larger than a predefined position. If the positions of the last significant coefficients for all considered TBs in the current CU are smaller than or equal to the predefined position, the secondary transform index for the current CU is not signaled. The 16×16 CU containing only one 16×16 transform block shown in FIG. 5 may be used to illustrate some examples of deciding whether a secondary transform index is signaled according to a position of a last significant coefficient in the 16×16 transform block. Assume that this 16×16 transform block is a considered TB in the current 16×16 CU. In the following embodiments, the secondary transform index is signaled at a CU level, or after the signaling of residual coding syntax for all TBs in the current CU, whereas the secondary transform index may be signaled at a TU, TB level, or after signaling the residual coding syntax including positions of the last significant coefficients for one or more TBs in the current CU in some other embodiments and if the secondary transform is signaled at TU, TB level, or after signaling the residual coding syntax including positions of the last significant coefficients for one or more TBs in the current CU, the considered TBs are within the current TU, current TB or the TBs signaling before the current TB. In other embodiments, the secondary transform index for a current CU is signaled after one or more luma TBs in the current CU, or is signaled after a first non-zero TB in the current CU, or is signaled after a first TB in the current CU.

The decoder parses last significant coefficient position syntax for each TB of a CU from the video bitstream, and determines the position of the last significant coefficient for each TB based on the parsed the last significant coefficient position syntax. For example, the last significant coefficient position syntax includes last_sig_coeff_x_prefix, last_sig_coeff_y_prefix, last_sig_coeff_x_suffix, and last_sig_coeff_y_suffix. The position of the last significant coefficient is compared with a predefined position, such as (0,0), and the decoder infers the secondary transform index as zero if the position of the last significant coefficient is equal to (0,0).

Separate secondary transform indices may be signaled for luma and chroma CB/CU. In this embodiment, for one luma CB and two chroma CBs coded in separate splitting trees, one secondary transform index is conditionally signaled for the luma CB depending on one or more luma TBs in the luma CB and another secondary transform index is conditionally signaled for the chroma CB depending on one or more chroma TBs in the chroma CB. In an alternative embodiment, only one secondary transform index is signaled for each CU, and one or both the luma and chroma TBs use the secondary transform index, for example, the secondary transform index is conditionally signaled for one or more luma TBs according to a position of a last significant coefficient in each luma TB or any subset of luma TBs, and the chroma TBs reuse the secondary transform index. In another example, the secondary transform index is conditionally signaled for one or more luma TBs according to positions of last significant coefficients in the luma and chroma TBs. In this embodiment, for a current CU coded in a shared splitting tree, one secondary transform index is conditionally signaled for the current CU, and secondary transform or inverse secondary transform is applied to one or both of luma and chroma TBs according to the secondary transform index. For example, if secondary transform is only applied to the luma TBs, the secondary transform index of the current CU is conditionally signaled depending on the luma and chroma TBs in the current CU. In one embodiment, the secondary transform index is larger than zero if secondary transform is applied to the 16×16 TU within the 16×16 CU, and the secondary transform index is set to zero if secondary transform is not applied to the 16×16 TU. In the following embodiments, the encoder adaptively skips signaling a secondary transform index according to comparison results from the considered TBs in a CU. Similarly, the decoder adaptively infers secondary transform is not applied to the transform block according to comparison results from the considered TBs in a CU.

Figure 10:
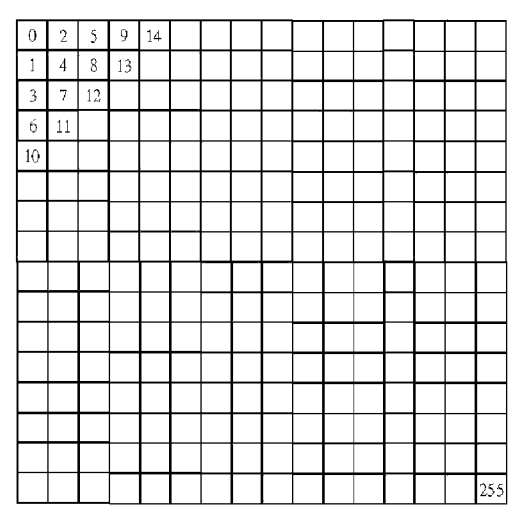

As shown in FIG. 5, there are four 4×4 coding groups in a top-left 8×8 region of the 16×16 transform block, including a first coding group CG 0, a second coding group CG 1, a third coding group CG 2, and a fourth coding group CG 3. The corresponding significant flags for CG 0, CG 1, CG 2, and CG 3 are denoted as $SigFlag_{CG0}$, $SigFlag_{CG1}$, $SigFlag_{CG2}$, and $SigFlag_{CG3}$. If secondary transform is applied to this 16×16 transform block, a 16×48 matrix is used to transform 48 primary transform coefficients of the top-left 8×8 region in the 16×16 transform block into 16 secondary transform coefficients. The 16 secondary transform coefficients replace the primary transform coefficients in the first coding group CG 0 of the top-left 8×8 region in the 16×16 transform block. Coefficients in CG 1 and CG 2 or coefficients in CG 1, CG 2, and CG 3 or the TB except for CG1 (the first 16 secondary transform coefficients) are set to zero after secondary transform. A region with all transform coefficients set to zero after secondary transform is represented as a zero-out region of secondary transform. If there is any significant coefficient located in the zero-out region of secondary transform, secondary transform is inferred to be disabled. The term coefficients or transform coefficients in the description refers to final coefficients delivered to a quantization process at the encoder or final coefficients received after a dequantization process at the decoder. In some embodiments, if the positions of the last significant coefficients in the considered TBs of a current CU are all smaller than or equal to the predefined position in a processing order, the secondary transform index for the current CU is not signaled at the encoder and inverse secondary transform for the current CU is inferred as disabled at the decoder. The encoder compares the positions of the last significant coefficients in the considered TBs in a current CU with the predefined position in a processing order. If the positions of the last significant coefficients in the considered TBs are all smaller than or equal to the predefined position in a processing order, the encoder skips signaling the secondary transform index for the current CU, otherwise, the encoder signals the secondary transform index based on other existing conditions. The decoder also compares the positions of the last significant coefficients for the considered TBs of a current CU with the predefined position in a processing order. The decoder parses the secondary transform index if the position of the last significant coefficient in at least one considered transform block is larger than the predefined position; otherwise inverse secondary transform is inferred to be disabled for the transform block. In this embodiment, the processing order may be a diagonal scanning order for a transform block, within each coding group, and/or across all coding groups in a transform block. An example of the processing order for a 16×16 transform block is from a top-left 8×8 region, a bottom-left 8×8 region, a top-right 8×8 region, to a bottom-right 8×8 region, and within each 8×8 region of the 16×16 transform block, the processing order is from a top-left coding group, a bottom-left coding group, a top-right coding group, to a bottom-right coding group, and within each coding group, the processing order is a diagonal scanning order. Another example of the processing order for a 16×16 transform block is from the top-left coefficient to the bottom-left coefficient, as shown in FIG. 10.

In the above embodiments, an example of the predefined position is a first position in a transform block, which contains the DC value in the transform block, such as position 0. In this embodiment, a secondary transform index is not signaled for a current block as secondary transform cannot be applied if there are only DC values in all considered transform block(s) within the current block (which means the positions of last significant coefficients for all considered TBs are at the first position in a TB). The current block is a CU, CB, or a TU. The secondary transform index is only signaled when a position of the last significant coefficient for at least one of the considered TBs is not equal to the first position in the transform block, which implies there is at least one non-DC value in at least one considered transform block. For example of a CU containing one TB, if a position of a last significant coefficient is at position C as shown in FIG. 5, which is within the first coding group CG 0 but larger than the first position in CG 0, the encoder signals a secondary transform index for the 16×16 CU and the decoder parses the secondary transform index from the video bitstream. In another example, if a position of a last significant coefficient is at position D as shown in FIG. 5, which is the first position in the first coding group CG 0, the encoder skips signaling a secondary transform index for the 16×16 CU and the decoder infers inverse secondary transform is not applied to the TU within the 16×16 CU. In this example, there is only a DC value in the transform block and applying secondary transform to this transform block will not bring additional coding gain, so secondary transform is disabled and secondary transform syntax is not signaled. Another embodiment of the predefined position is a fixed position (x,y) in a first coding group of a top-left 8×8 region, where x and y can be integers selecting from 0, 1, 2, 3, . . . to (a maximum coding group size−1). For example, the fixed position (x,y) is (0,1), (1,0), or (1,1) in the first coding group CG 0 of a top-left 8×8 region within the transform block. Another example of the predefined position in CG 0 is determined by a fixed scanning order, for example, the first, second, third, fourth, to (a maximum coding group size—1)$^{th}$ position in the first coding group CG 0 according to a fixed scanning order. An example of the fixed scanning order is a diagonal scanning order.

Some embodiments of the present invention also check if a number of non-zero coefficients in a first coding group CG 0 of the 16×16 transform block is larger than a predefined number, and the encoder or decoder only signals or parses a secondary transform index when the number of non-zero coefficients in CG 0 is larger than the predefined number. If the number of non-zero coefficients in CG 0 is less than or equal to the predefined number, secondary transform is not applied to the transform block according to this embodiment. The encoder skips signaling a secondary transform index for a current CU when a number of non-zero coefficients in CG 0 of the transform block within the current CU is smaller than or equal to the predefined number. Some examples of the predefined number are 1, 2, 3, and 4. In an embodiment, the encoder signals the secondary transform index if a position of the last significant coefficient is larger than a predefined position or if the number of non-zero coefficients in a first coding group of a top-left 8×8 region is larger than a predefined number and the position of the last significant coefficient is within the first coding group, otherwise the encoder skips signaling the secondary transform index. Some examples of the predefined position are the 64$^{th}$ position and 48$^{th}$ position, and an example of the predefined number is 1. In an embodiment of enabling secondary transform for a current CU containing multiple TUs, secondary transform may only be applied when a number of non-zero coefficients in CG 0 of all the TUs are larger than the predefined number. For example, a secondary transform index is not signaled nor parsed if each transform block in a current CU contains less than or equal to one non-zero coefficient.

In some other embodiments, a number of non-DC values in the considered transform blocks within a CU is determined and compared with a predefined number to decide secondary transform signaling, for example, secondary transform is only applied when there is at least one non-DC transformed value in at least one considered transform block within a CU. In this embodiment, a secondary transform index is signaled when there is at least one non-DC transformed value in at least one considered transform block within a CU at the encoder. Similarly, the decoder only parses a secondary transform index when there is at least one non-DC transformed value in at least one considered transform block within a CU. The decoder disables inverse secondary transform for TBs within a current CU by inferring a secondary transform index to be zero without parsing the secondary transform index when all TBs in the current CU contain only DC coefficients. In one embodiment, the secondary transform index is signaled or parsed if a position of the last significant coefficient for at least one considered transform block within a CU is larger than a predefined position or if a number of non-DC values in at least one considered transform block within a CU is larger than a predefined number and/or the position of the last significant coefficient is within the first coding group CG 0 of a top-left 8×8 region in each considered transform block within a CU. An example of the predefined number is 0 and some examples of the predefined position are the first position in the transform block. In an embodiment of setting the predefined number to be 0, the number of non-DC values may also be derived from the positions of the last significant coefficients or the last significant coefficient position syntax for the considered TBs, that is the number of non-DC values is larger than the predefined number (e.g. equal to 0) if the position of the last significant coefficient for at least one considered TBs is larger than the first position of the transform block. This embodiment is equivalent to signaling or parsing a secondary transform index when positions of last significant coefficients for at least one considered TBs are larger than a predefined position or when the positions of the last significant coefficients for at least one considered TBs are within a first coding group except for a first position of the first coding group.

Figure 6:
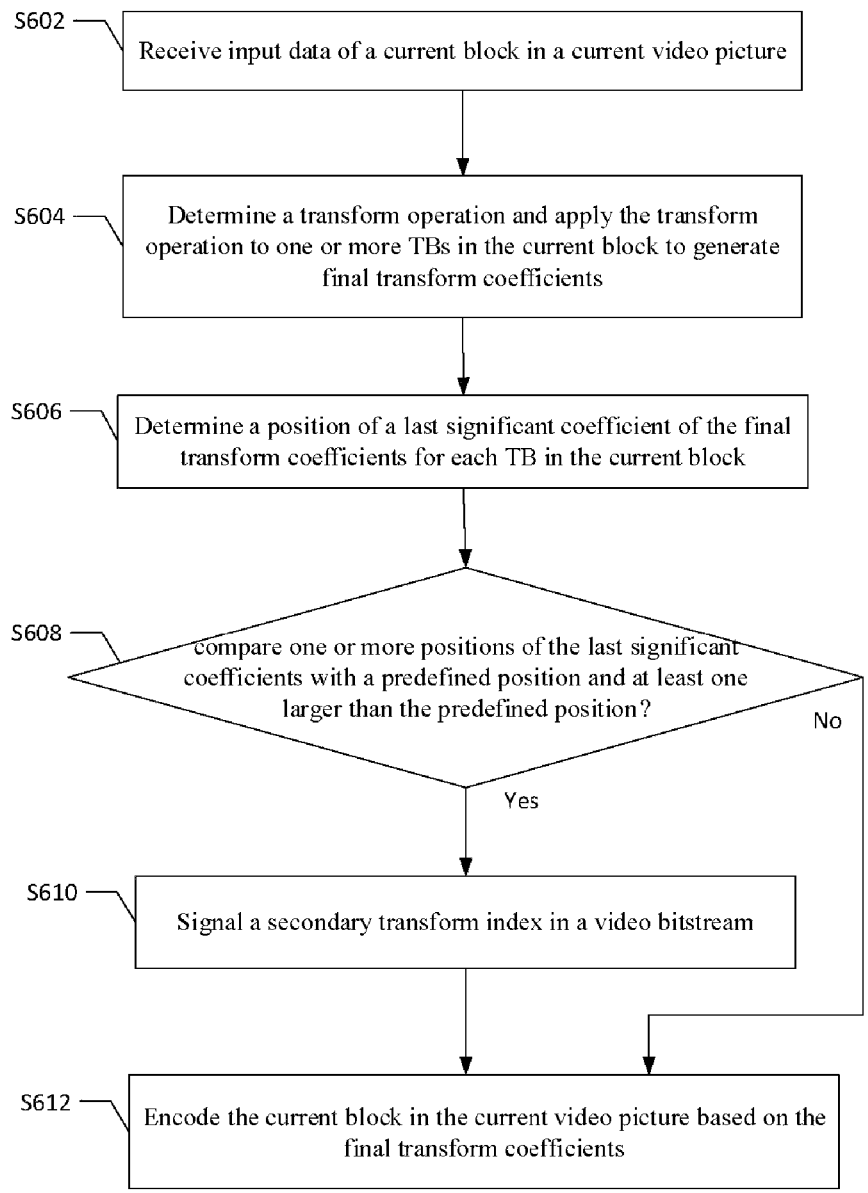
FIG. 6 is a flowchart illustrating a video encoding method of adaptively signaling secondary transform syntax by comparing a position of a last significant coefficient with a predefined position according to an embodiment of the present invention.

Exemplary Flowcharts Illustrating Embodiments of Secondary Transform Signaling based on Position Comparison FIG. 6 is a flowchart illustrating an exemplary embodiment of a video encoding method of conditionally signaling secondary transform syntax depending on comparison results of last significant coefficient positions implemented in a video encoding system. The video encoding system in this exemplary embodiment processes residuals associated with one or more TBs in a current CU by a transform operation, where the residuals associated with the current CU is partitioned into one or more Transform Units (TUs), and each TU is composed of luma and chroma Transform Blocks (TBs). Secondary transform may be applied to one or both luma and chroma components in this exemplary embodiment. The exemplary embodiment of the video encoding system in FIG. 6 receives input data associated with a current block in a current video picture in step S602. An example of the current block is a CU, containing one luma TB and two chroma TBs. The input data in step S602 includes residuals generated by a prediction operation applied to the current CU, an example of the prediction is intra prediction. The video encoding system determines a transform operation in step S604 and applies the transform operation to the one or more TBs in the current block to generate final transform coefficients, for example, the one or more TBs is the luma TB(s) in the current CU. The transform operation includes both primary and secondary transform or the transform operation only includes one of primary transform and secondary transform. In some embodiments, one or more considered TBs are used to determine secondary transform signaling. Some examples of the considered TBs include: all TBs in the current block, only luma TBs in the current block, only chroma TBs in the current block, only TBs with significant coefficients in the current block, a predefined subset of TBs in the current block, and all TBs except for those not allowed for secondary transform. For example, a TB is not allowed for secondary transform if a TB width or a TB height is less than 4 samples, or a TB is not allowed for secondary transform if it is processed by transform skip. The video encoding system determines a position of a last significant coefficient of the final transform coefficients for each TB in the current block in step S606, and compares one or more positions of the last significant coefficients for one or more TBs with a predefined position in step S608, for example, the positions of the last significant coefficients for the considered TBs are compared with the predefined position. For example, the predefined position is a first position in the transform block as the first position contains a DC value. In this example, if the position of the last significant coefficient of at least one TB is larger than the first position, it implies there is at least one non-DC coefficient in the TB, and the video encoding system incorporates a secondary transform index for the current CU in a video bitstream. If all the positions of the last significant coefficients for the one or more TBs are equal to the first position, it implies there is only a DC coefficient in each TB in the current block, and the video encoding system skips signaling the secondary transform index. The video encoding system determines a value of the secondary transform index according to the transform operation applied to the current block, for example, the secondary transform index is equal to zero when secondary transform is disabled and the secondary transform index is equal to one or two when secondary transform is applied. The step of determining the secondary transform index may be performed at any step in steps S604, S606, S608, and S610. If the position of the last significant coefficient of at least one TB is larger than the predefined position in step S608, the secondary transform index is signaled in the video bitstream for the current block in step S610, for example, the secondary transform index is signaled at a CU level, a CB level, a TU level, or a TB level. The current block is then encoded according to the final transform coefficients in step S612. If the positions of the last significant coefficients for the one or more TBs are smaller than or equal to the predefined position in step S608, the secondary transform index is not signaled by the video encoding system, and the current block is encoded according to the final transform coefficients in step S612.

Figure 7:
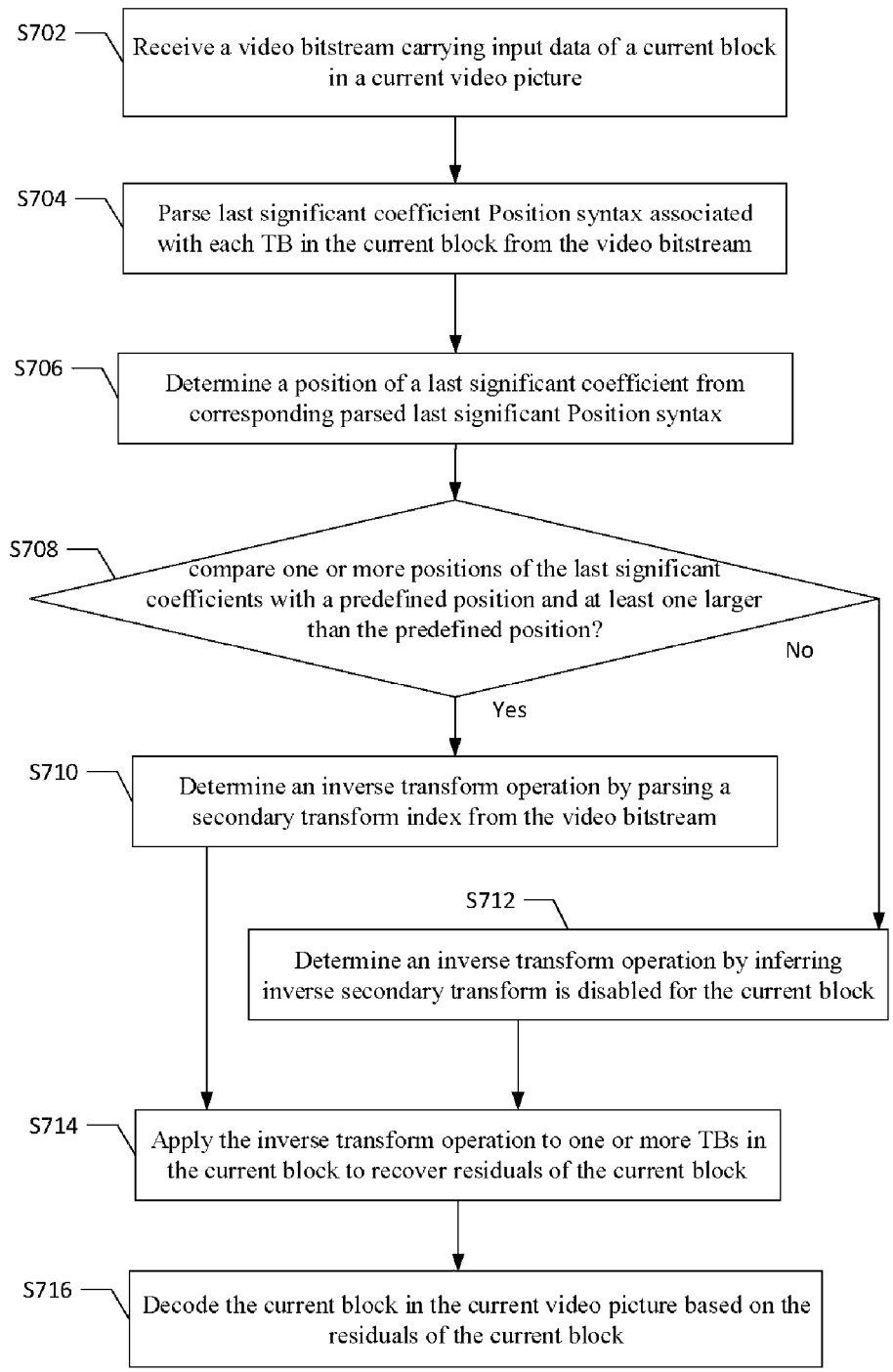
FIG. 7 is a flowchart illustrating a video decoding method of adaptively parsing secondary transform syntax by comparing a position of a last significant coefficient with a predefined position according to an embodiment of the present invention.

FIG. 7 is a flowchart illustrating an exemplary embodiment of a video decoding method of conditionally parsing secondary transform syntax depending on comparison results of last significant coefficient positions implemented in a video decoding system. The video decoding system receives a video bitstream carrying input data of a current block in a current video picture in step S702. The current block is a CU in this exemplary embodiment, for example, the current block contains one or more luma TBs and two chroma TBs. A last significant coefficient position syntax associated with each TB in the current block is parsed from the video bitstream in step S704. The video decoding system determines a position of a last significant coefficient from the parsed last significant coefficient position syntax in step S706 and compares one or more positions of the last significant coefficients for one or more TBs with a predefined position in step S708. In an embodiment, only considered TBs in the current block are used to determine secondary transform signaling, so only positions of the last significant coefficients for the considered TBs are compared with a predefined position in step S708. Some examples of the considered TBs include: all TBs in the current block, only luma TBs in the current block, only chroma TBs in the current block, only TBs with significant coefficients in the current block, a predefined subset of TBs in the current block, and all TBs except for those not allowed for secondary transform. For example, a TB is not allowed for secondary transform if a TB width or a TB height is less than 4 samples, or a TB is not allowed for secondary transform if it is processed by transform skip. For example, the predefined position is a first location in the current block, and the video decoding system infers inverse secondary transform is not applied if the one or more locations of the last significant coefficients for the one or more TBs are equal to the first location without parsing a corresponding secondary transform index. When the location of the last significant coefficient for a TB falls in the first location, the TB contains only a DC value at the first location and all other transform coefficients in the TB are zero. If the position of the last significant coefficient for at least one TB is larger than the predefined position, the video decoding system parses a secondary transform index from the video bitstream in step S710. The secondary transform index is used to determine an inverse transform operation for one or more TBs in the current block, for example, the inverse transform operation skips inverse secondary transform if the secondary transform index is equal to zero, and the inverse transform operation performs both inverse secondary transform and inverse primary transform if the secondary transform index is equal to one or two. If all the positions of the last significant coefficients for the one or more TBs are smaller than or equal to the predefined position in step S708, the video decoding system determines the inverse transform operation by inferring inverse secondary transform is disabled for the one or more TBs in the current block in step S712. After determining the inverse transform operation, the video decoding system applies the inverse transform operation to the one or more TBs in the current block to recover residuals in step S714 and decodes the current block based on the residuals in step S716. For example, inverse secondary transform is only applied to the luma TB(s) in the current block but both luma and chroma TBs are checked to determine whether the secondary transform index needs to be parsed.

Figure 8:
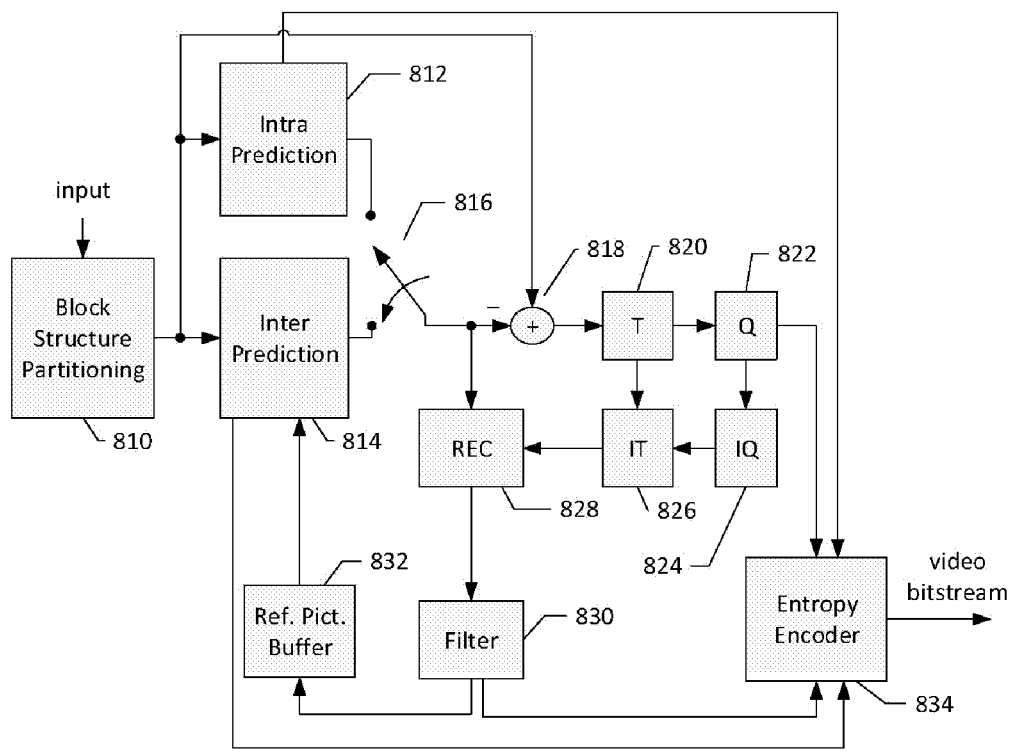
FIG. 8 illustrates an exemplary system block diagram for a video encoding system incorporating a video processing method according to embodiments of the present invention.

Exemplary System Block Diagram Embodiments of the previously described video processing method are implemented in video encoders, video decoders, or both the video encoders and decoders. For example, the video processing method is implemented in an entropy coding module in the video encoder or in an entropy decoding module in the video decoder. Alternatively, the video processing method is implemented in a circuit integrated to the entropy coding module in the video encoder or video decoder. FIG. 8 illustrates an exemplary system block diagram for a Video Encoder 800 implementing various embodiments of the video processing method. A Block Structure Partitioning module 810 in the Video Encoder 800 receives input data of video pictures and determines a block partitioning structure for each video picture to be encoded. Each leaf coding block in the current video picture is predicted by Intra prediction in an Intra Prediction module 812 or Inter prediction in an Inter Prediction module 814 to remove spatial redundancy or temporal redundancy. The Intra Prediction module 812 provides intra predictors for the leaf coding block based on reconstructed video data of the current video picture. The Inter Prediction module 814 performs Motion Estimation (ME) and Motion Compensation (MC) to provide inter predictors for the leaf coding block based on video data from other video picture or pictures. A Switch 816 selects either the Intra Prediction module 812 or Inter Prediction module 814 to supply the predictor to an Adder 818 to form prediction errors, also called residuals. The residuals in each leaf coding block in the current video picture are divided into one or multiple transform blocks. A Transform (T) module 820 determines a transform operation for one or more transform blocks in a current CU, and the transform operation includes one or both of primary transform and secondary transform. Some embodiments of the present invention checks if a position of a last significant coefficient in each considered transform block is larger than a predefined position, and disables secondary transform for the one or more transform block if the positions of the last significant coefficients for all considered transform block are less than or equal to the predefined position. In this case, a secondary transform index is not signaled in a video bitstream if the position of the last significant coefficient for at least one considered transform block is less than or equal to the predefined position. The residuals of each transform block are processed by the Transform (T) module 820 followed by a Quantization (Q) module 822 to generate transform coefficient levels to be encoded by an Entropy Encoder 834. The Entropy Encoder 834 also encodes prediction information and filter information to form a video bitstream. The video bitstream is then packed with side information. The transform coefficient levels of the current transform block are processed by an Inverse Quantization (IQ) module 824 and an Inverse Transform (IT) module 826 to recover the residuals of the current transform block. As shown in FIG. 8, reconstructed video data are recovered by adding back the residuals to the selected predictor at a Reconstruction (REC) module 828. The reconstructed video data may be stored in a Reference Picture Buffer (Ref. Pict. Buffer) 832 and used by the Inter Prediction module 814 for prediction of other pictures. The reconstructed video data from the Reconstruction module 828 may be subject to various impairments due to the encoding processing, consequently, an In-loop Processing Filter 830 is applied to the reconstructed video data before storing in the Reference Picture Buffer 832 to further enhance picture quality.

Figure 9:
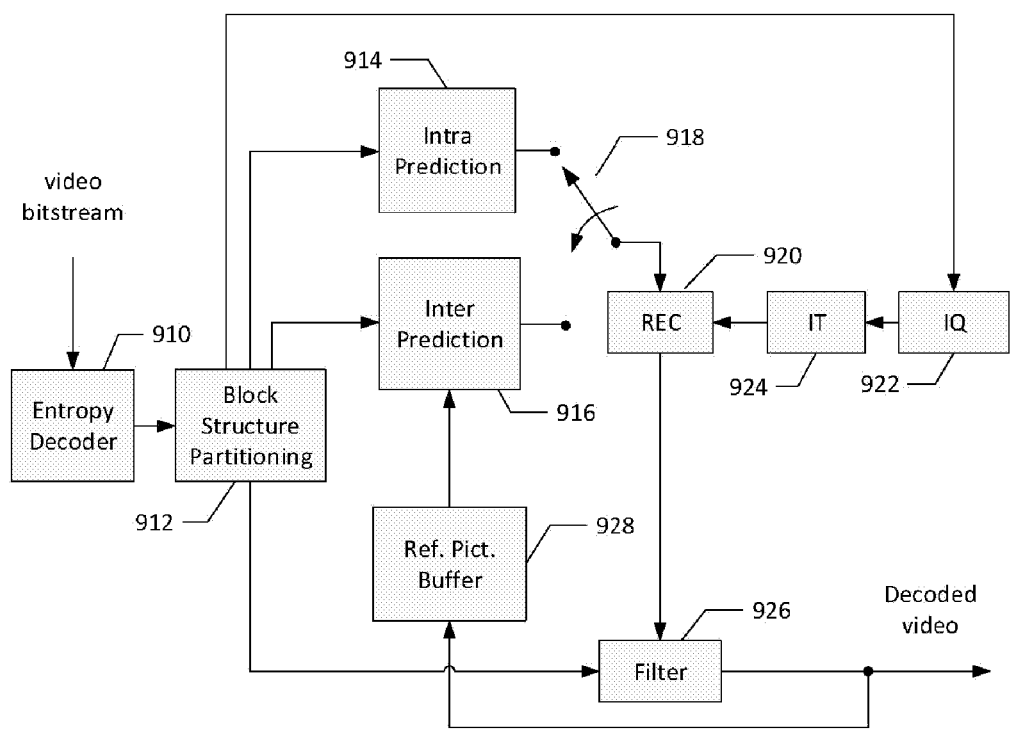
FIG. 9 illustrates an exemplary system block diagram for a video decoding system incorporating a video processing method according to embodiments of the present invention.

A corresponding Video Decoder 900 for decoding the video bitstream generated by the Video Encoder 800 of FIG. 8 is shown in FIG. 9. The input to the Video Decoder 900 is decoded by an Entropy Decoder 910 to parse and recover transform coefficient levels of each transform block and other system information. A Block Structure Partitioning module 912 determines a block partitioning structure for each video picture. The decoding process of the Decoder 900 is similar to the reconstruction loop at the Encoder 800, except the Decoder 900 only requires motion compensation prediction in Inter Prediction module 916. Each leaf coding block in the video picture is decoded by either an Intra Prediction module 914 or an Inter Prediction module 916, and a Switch 918 selects an Intra predictor or Inter predictor according to decoded mode information. The transform coefficient levels associated with each transform block is then recovered by an Inverse Quantization (IQ) module 922 to generate final transform coefficients. An Inverse Transform (IT) module 924 applies an inverse transform operation to the final transform coefficients to recover residuals. The inverse transform operation includes one or both inverse secondary transform and inverse primary transform. Some embodiments of the present invention determines a position of a last significant coefficient for each considered TB in a current CU by parsing a last significant coefficient position associated with the considered TB, and infers inverse secondary transform for one or more TBs in the current CU is disabled if the positions of the last significant coefficients for all considered TBs are less than or equal to the predefined threshold. If the position of the last significant coefficient of at least one considered TB is larger than the predefined threshold, the Inverse Transform (IT) module determines an inverse transform operation according to a secondary transform index parsed from the video bitstream. The recovered residuals are reconstructed by adding back the predictor in a Reconstruction (REC) module 920 to produce reconstructed video. The reconstructed video is further processed by an In-loop Processing Filter (Filter) 926 to generate final decoded video. If a currently decoded video picture is a reference picture, the reconstructed video of the currently decoded video picture is also stored in a Reference Picture Buffer 928 for later pictures in decoding order.

Various components of the Video Encoder 800 and Video Decoder 900 in FIG. 8 and FIG. 9 may be implemented by hardware components, one or more processors configured to execute program instructions stored in a memory, or a combination of hardware and processor. For example, a processor executes program instructions to control applying a transform operation or an inverse transform operation. The processor is equipped with a single or multiple processing cores. In some examples, the processor executes program instructions to perform functions in some components in the Encoder 800 and Decoder 900, and the memory electrically coupled with the processor is used to store the program instructions, information corresponding to the reconstructed data, and/or intermediate data during the encoding or decoding process. The memory in some embodiments includes a non-transitory computer readable medium, such as a semiconductor or solid-state memory, a Random Access Memory (RAM), a Read-Only Memory (ROM), a hard disk, an optical disk, or other suitable storage medium. The memory may also be a combination of two or more of the non-transitory computer readable mediums listed above. As shown in FIGS. 8 and 9, the Encoder 800 and Decoder 900 may be implemented in the same electronic device, so various functional components of the Encoder 800 and Decoder 900 may be shared or reused if implemented in the same electronic device. Any of the embodiments of the present invention may be implemented in a Transform module 820 of the Encoder 800, and/or an Inverse Transform module 924 of the Decoder 900. Alternatively, any of the embodiments may be implemented as a circuit coupled to the Transform module 820 of the Encoder 800 and/or the Inverse Transform module 924 of the Decoder 900, so as to provide the information needed by the Transform module 820 or the Inverse Transform module 924.

Embodiments of the video processing methods adaptively enable secondary transform may be implemented in a circuit integrated into a video compression chip or program code integrated into video compression software to perform the processing described above. For examples, applying a transform operation or an inverse transform operation may be realized in program codes to be executed on a computer processor, a Digital Signal Processor (DSP), a microprocessor, or Field Programmable Gate Array (FPGA). These processors can be configured to perform particular tasks according to the invention, by executing machine-readable software code or firmware code that defines the particular methods embodied by the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of decoding video data in a video coding system, comprising:
    receiving a video bitstream carrying input data associated with a current block in a current video picture, wherein the input data comprises final transform coefficients of the current block;
    parsing one or more last significant coefficient position syntax for one or more Transform Blocks (TBs) associated with the current block from the video bitstream;
    determining a position of a last significant coefficient for each TB from the corresponding parsed last significant coefficient position syntax;
    comparing one or more positions of the last significant coefficients with a predefined position;
    determining an inverse transform operation for the current block by inferring a secondary transform index as zero if the one or more positions of the last significant coefficients for one or more TBs are less than or equal to the predefined position, or by parsing a secondary transform index from the video bitstream if at least one of the positions of the last significant coefficients is larger than the predefined position;
    applying at least inverse primary transform to the final transform coefficients of the current block to recover residuals of the current block according to the inverse transform operation; and
    decoding the current block in the current video picture based on the residuals of the current block.

2. The method of claim 1, wherein when the step of determining an inverse transform operation for the current block is determining by parsing a secondary transform index from the video bitstream if at least one of the positions of the last significant coefficients is larger than the predefined position, the method further comprises applying inverse secondary transform before applying inverse primary transform to the final transform coefficients of the current block according to the parsed secondary transform index.

3. The method of claim 1, wherein the current block is a current Coding Unit (CU) and the secondary transform index is parsed after parsing all TBs in the current block.

4. The method of claim 1, wherein the current block is a luminance (luma) or chrominance (chroma) Coding Block (CB) containing one or more luma or chroma TBs, wherein the secondary transform index is adaptively parsed according to the one or more positions of the last significant coefficients in the one or more luma or chroma TBs.

5. The method of claim 1, wherein the current block contains one or more luminance (luma)TBs and the current block further comprises one or more chrominance (chroma) TBs, wherein the secondary transform index is adaptively parsed for the one or more luma or chroma TBs according to the one or more positions of the last significant coefficients in the one or more luma or chroma TBs, and the inverse transform operation is performed on the one or more luma or chroma TBs based on the parsed secondary transform index.

6. The method of claim 1, further comprising decoding the current block by intra prediction, wherein the inverse transform operation skips inverse secondary transform for non-intra coded blocks.

7. The method of claim 1, wherein the predefined position is a first position in a transform block, and the first position is position 0 containing a DC value.

8. The method of claim 1, wherein the predefined position is a fixed position (x,y) in a first coding group, wherein the first coding group is a first 4×4 subblock according to a processing order in a top-left 8×8 region of the current block and x and y are integers selected from zero to (a maximum coding group size −1).

9. The method of claim 1, further comprising parsing one or more syntax elements related to residual coding for the one or more TBs parsing after the current block if inverse secondary transform is not applied, or skip parsing one or more syntax elements related to residual coding for the one or more TBs parsing after the current block if inverse secondary transform is applied, wherein the one or more syntax elements contain significant flags for predefined coding groups.

10. The method of claim 9, wherein the predefined coding groups comprise a zero-out region of secondary transform and the zero-out region of secondary transform is a region with all transform coefficients set to zero after secondary transform.

11. The method of claim 1, wherein the current block is a transform block and the secondary transform index is parsed after parsing coefficients of the current block.

12. The method of claim 1, wherein the step of comparing one or more positions of the last significant coefficients with a predefined position is only applied to considered TBs in the current block, and the step of determining an inverse transform operation for the current block only depends on positions of the last significant coefficients of the considered TBs in the current block.

13. The method of claim 12, wherein the considered TBs are one of the following: all TBs in the current block, only luminance (luma) TBs in the current block, only chrominance (chroma) TBs in the current block, TBs with significant coefficients in the current block, a predefined subset of TBs in the current block, or all TBs except for those not allowed for secondary transform.

14. The method of claim 13, wherein the TBs not allowed for secondary transform include any TB with a TB width or TB height less than 4 samples or any TB processed by transform skip.

15. The method of claim 12, wherein inverse secondary transform is not applied to any TB in the current block if there is no considered TB in the current block.

16. An apparatus for performing video encoding, comprising: a computer processor configured for receiving video data; and programming executable on the computer processor for video coding by performing steps comprising:

receiving input data associated with a current block in a current video picture, wherein the input data comprises residuals of the current block;

determining and applying a transform operation to the residuals associated with one or more Transform Block (TBs) of the current block to generate final transform coefficients;

determining a position of a last significant coefficient of the final transform coefficients for each TB in the current block and comparing one or more positions of the last significant coefficient with a predefined position;

determining a value of a secondary transform index according to the transform operation applied to the current block;

signaling the secondary transform index in a video bitstream if at least one of the positions of the last significant coefficients is larger than the predefined position, or skip signaling the secondary transform index if the one or more positions of the last significant coefficients are less than or equal to the predefined position; and encoding the current block in the current video picture according to the final transform coefficients of the current block.

17. An apparatus for performing video decoding, comprising: a computer processor configured for receiving video data; and programming executable on the computer processor for video coding by performing steps comprising:

receiving a video bitstream carrying input data associated with a current block in a current video picture, wherein the input data comprises final transform coefficients of the current block;

parsing one or more last significant coefficient position syntax for one or more Transform Blocks (TBs) associated with the current block from the video bitstream;

determining a position of a last significant coefficient for each TB from the parsed last significant coefficient position syntax;

comparing one or more positions of the last significant coefficients with a predefined position;

determining an inverse transform operation for the current block by inferring a secondary transform index as zero if the one or more positions of the last significant coefficients for one or more TBs are less than or equal to the predefined position, or by parsing a secondary transform index from the video bitstream if at least one of the positions of the last significant coefficients is larger than the predefined position;

applying at least inverse primary transform to the final transform coefficients of the current block to recover residuals of the current block according to the inverse transform operation; and decoding the current block in the current video picture based on the residuals of the current block.

\* \* \* \* \*